United States Patent
Imachi et al.

(10) Patent No.: US 7,572,548 B2
(45) Date of Patent: Aug. 11, 2009

(54) NON-AQUEOUS ELECTROLYTE BATTERY AND METHOD OF MANUFACTURING THE SAME

(75) Inventors: Naoki Imachi, Kobe (JP); Denis Yau Wai Yu, Kobe (JP); Shin Fujitani, Kobe (JP)

(73) Assignee: SANYO Electric Co., Ltd., Osaka (JP)

( * ) Notice: Subject to any disclaimer, the term of this patent is extended or adjusted under 35 U.S.C. 154(b) by 405 days.

(21) Appl. No.: 11/477,791

(22) Filed: Jun. 30, 2006

(65) Prior Publication Data
US 2007/0003829 A1    Jan. 4, 2007

(30) Foreign Application Priority Data
Jun. 30, 2005    (JP)    ............................. 2005-191874

(51) Int. Cl.
*H01M 2/02*    (2006.01)
(52) U.S. Cl. ...................................... 429/152; 429/209
(58) Field of Classification Search ................. 429/152, 429/221, 231.3, 254, 223, 224, 231.1, 209, 429/128, 231.95, 62, 144; 29/623.5
See application file for complete search history.

(56) References Cited

U.S. PATENT DOCUMENTS

2006/0019151 A1*  1/2006  Imachi et al. ............... 429/128
2007/0207383 A1*  9/2007  Ohzuku et al. .............. 429/223

FOREIGN PATENT DOCUMENTS

| JP | 2001-143705 A | 5/2001 |
| JP | 2001-143708 A | 5/2001 |
| JP | 2001-338639 | * 12/2001 |
| JP | 2001-338639 A | 12/2001 |

* cited by examiner

*Primary Examiner*—Patrick Ryan
*Assistant Examiner*—Monique Wills
(74) *Attorney, Agent, or Firm*—Kubovcik & Kubovcik

(57) ABSTRACT

A non-aqueous electrolyte battery and a method of manufacturing the battery are provided. The non-aqueous electrolyte battery has a positive electrode including a positive electrode active material-layer stack containing a plurality of different positive electrode active materials and formed on a positive electrode current collector surface, a negative electrode including a negative electrode active material layer, and a separator interposed between the electrodes. The positive electrode active material-layer stack includes two or more layers respectively containing different positive electrode active material components, and of the two or more layers, the layer nearer the positive electrode current collector is formed by coating the collector with a positive electrode active material having the highest resistance increase rate and a conductive agent contained in that positive electrode active material by cold spraying.

3 Claims, 11 Drawing Sheets

NON-AQUEOUS ELECTROLYTE BATTERY AND METHOD OF MANUFACTURING THE SAME

BACKGROUND OF THE INVENTION

1. Field of the Invention

The present invention relates to improvements in non-aqueous electrolyte batteries, such as lithium-ion batteries and polymer batteries, and in methods of manufacturing the batteries. More particularly, the invention relates to a non-aqueous electrolyte battery that has excellent safety during overcharge and a method of manufacturing the battery.

2. Description of Related Art

Rapid advancements in size and weight reduction of mobile information terminal devices such as mobile telephones, notebook computers, and PDAs in recent years have created demand for higher capacity batteries as driving power sources for the devices. With their high energy density and high capacity, non-aqueous electrolyte batteries that perform charge and discharge by transferring lithium ions between the positive and negative electrodes have been widely used as the driving power sources for the mobile information terminal devices. Moreover, utilizing their characteristics, applications of non-aqueous electrolyte batteries, especially Li-ion batteries, have recently been broadened to middle-sized and large-sized batteries for power tools, electric automobiles, hybrid automobiles, etc., as well as mobile applications such as mobile telephones. As a consequence, demand for increased battery safety has been on the rise, along with demand for increased capacity and higher output power.

Many of commercially available non-aqueous electrolyte batteries, especially Li-ion batteries, adopt lithium cobalt oxide as their positive electrode active material. The energy that can be attained by lithium cobalt oxide, however, has almost reached the limit already. Therefore, to achieve higher battery capacity, it has been inevitable to increase the filling density of the positive electrode active material. Nevertheless, increasing the filling density of the positive electrode active material causes battery safety to degrade when the battery is overcharged. In other words, since there is a trade-off between improvement in battery capacity and enhancement in battery safety, improvements in capacity of the battery have lately made little progress. Even if a new positive electrode active material that can serve as an alternative to lithium cobalt oxide will be developed in the future, the necessity of increasing the filling density of the positive electrode active material to achieve a further higher capacity will still remain the same because the energy that can be attained by that newly developed active material will also reach the limit sooner or later.

Conventional unit cells incorporate various safety mechanisms such as a separator shutdown function and additives to electrolyte solutions, but these mechanisms are designed assuming a condition in which the filling density of active material is not very high. For that reason, increasing the filling density of active material as described above brings about such problems as follows. Since the infiltrating performance of the electrolyte solution into the interior of the electrodes is greatly reduced, reactions occur locally, causing lithium to deposit on the negative electrode surface. In addition, the convection of electrolyte solution is worsened and heat is entrapped within the electrodes, worsening heat dissipation. These prevent the above-mentioned safety mechanisms from fully exhibiting their functions, leading to further degradation in safety. Thus, it is necessary to establish a battery design that can make full use of those safety mechanisms without considerably compromising conventional battery designs.

To resolve the foregoing problems, various techniques have been proposed. For example, Japanese Published Unexamined Patent Application No. 2001-143705 proposes a Li-ion secondary battery that has improved safety using a positive electrode active material in which lithium cobalt oxide and lithium manganese oxide are mixed. Japanese Published Unexamined Patent Application No. 2001-143708 proposes a Li-ion secondary battery that improves storage performance and safety using a positive electrode active material in which two layers of lithium-nickel-cobalt composite oxides having different compositions are formed. Japanese Published Unexamined Patent Application No. 2001-338639 proposes a Li-ion secondary battery in which, for the purpose of enhancing battery safety determined by a nail penetration test, a plurality of layers are formed in the positive electrode and a material with high thermal stability is disposed in the lowermost layer of the positive electrode, to prevent the thermal runaway of the positive electrode due to heat that transfers via the current collector to the entire battery.

The above-described conventional batteries have the following problems.

(1) JP 2001-143705A

Merely mixing lithium cobalt oxide and lithium manganese oxide cannot fully exploit the advantage of lithium manganese oxide, which has excellent safety. Therefore, an improvement in safety cannot be attained.

(2) JP 2001-143708A

Lithium-nickel-cobalt composite oxide has lithium ions that can be abundantly extracted from its structure during overcharge. Since the lithium can deposit on the negative electrode and become a source of heat generation, it is difficult to improve the safety during overcharge and the like sufficiently.

(3) JP 2001-338639A

The above-described construction is intended for merely preventing the thermal runaway of a battery due to heat dissipation through the current collector under a certain voltage, and is not effective in preventing the thermal runaway of an active material that originates from deposited lithium on the negative electrode such as when overcharged. (The details will be discussed later.)

BRIEF SUMMARY OF THE INVENTION

Accordingly, it is an object of the present invention to provide a non-aqueous electrolyte battery that achieves improvements in safety, particularly improvements in tolerance of a battery to overcharging, without considerably compromising the conventional battery designs, and to provide a method of manufacturing the battery.

In order to accomplish the foregoing and other objects, the present invention provides a non-aqueous electrolyte battery comprising: a positive electrode including a positive electrode active material-layer stack and a positive electrode current collector, the positive electrode active material-layer stack being formed on a surface of the positive electrode current collector and comprising a plurality of layers respectively having a plurality of different positive electrode active materials, wherein, among the plurality of layers, a layer being in contact with the positive electrode current collector preferably consists only of a positive electrode active material having the highest resistance increase rate during overcharge among the plurality of positive electrode active materials or consists of the positive electrode active material having the highest resistance increase rate and a conductive agent contained in that positive electrode active material; a negative electrode including a negative electrode active material layer; and a separator interposed between the electrodes. In less preferred embodiments, the layer in contact with the positive electrode current collector can also include other active materials and/or a conductivity enhancing agent in amounts that do not affect the novel and basic characteristics of the non-aqueous electrolyte battery of the present invention.

The present invention also provides a method of manufacturing a non-aqueous electrolyte battery having a positive electrode including a positive electrode active material-layer stack and a positive electrode current collector, the positive electrode active material-layer stack being formed on a surface of the positive electrode current collector and comprising a plurality of positive electrode active material layers containing a plurality of positive electrode active materials, a negative electrode including a negative electrode active material layer, and a separator interposed between the electrodes, the method comprising: a first step of causing particles of a positive electrode active material having the highest resistance increase rate among the plurality of positive electrode active materials to adhere to a surface of the positive electrode current collector using a cold spraying method, to form one of the positive electrode active material layers; a second step of applying another one or more of the plurality of positive electrode active materials onto a surface of the one of the positive electrode active material layers to form one or more other positive electrode active material layers, whereby the positive electrode is prepared; and a third step of arranging the positive electrode and the negative electrode and interposing the separator therebetween.

The present invention achieves the advantageous effect of improvement in battery safety, particularly improvement in the tolerance of a battery to overcharging, without compromising conventional battery designs considerably or degrading energy density.

DETAILED DESCRIPTION OF THE INVENTION

Figure 1:
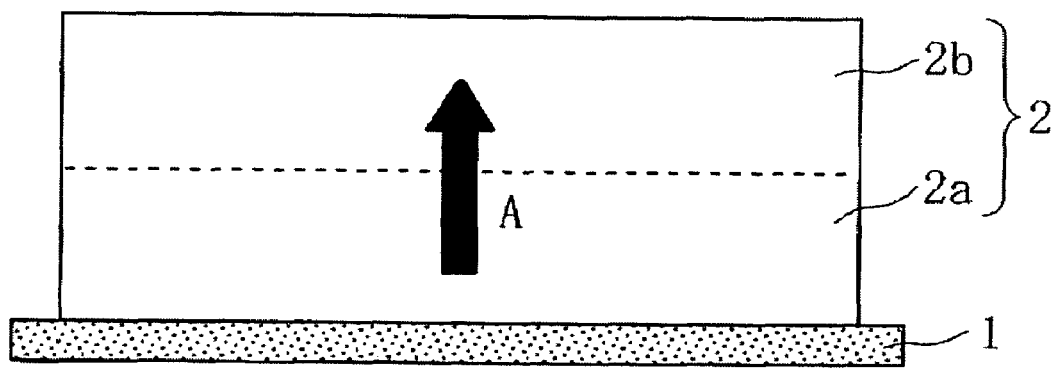
FIG. 1 is a view illustrating a heat transfer passage in a conventional positive electrode.

A non-aqueous electrolyte battery of the invention comprises a positive electrode, a negative electrode, and a separator. The positive electrode includes a positive electrode active material-layer stack and a positive electrode current collector. The positive electrode active material-layer stack is formed on a surface of the positive electrode current collector, and comprises a plurality of layers respectively having a plurality of different positive electrode active materials. Among the plurality of layers, a layer being in contact with the positive electrode current collector can consist only of a positive electrode active material having the highest resistance increase rate during overcharge among the plurality of positive electrode active materials. The layer in contact with the positive electrode current collector can also consist of the positive electrode active material having the highest resistance increase rate and a conductive agent contained in the positive electrode active material having the highest resistance increase rate. The negative electrode includes a negative electrode active material layer. The separator is interposed between the electrodes.

When, as in the foregoing construction, the layer in contact with the positive electrode current collector consists only of the positive electrode active material having the highest resistance increase rate during overcharge among the plurality of different positive electrode active materials, or comprises the positive electrode active material having the highest resistance increase rate during overcharge and the conductive agent contained in that positive electrode active material, the current collection performance of the layer(s) other than the layer in contact with the positive electrode current collector (hereinafter also referred to as "the layer(s) away from the positive electrode current collector"), which generally has (have) a high reactivity during overcharge, lowers considerably; this inhibits the active material(s) in the layer(s) away from the positive electrode current collector from being charged to the charge depth that should be reached otherwise. Accordingly, the amount of lithium deintercalated from the positive electrode in the overcharge region (especially the amount of lithium deintercalated from the outermost positive electrode layer among the layers away from the positive electrode current collector) decreases, reducing the total amount of lithium deposited on the negative electrode. Consequently, the amount of heat produced due to the reaction between the electrolyte solution and the lithium deposited on the negative electrode reduces, thereby preventing the deposition of dendrite. Moreover, thermal stability of the positive electrode active materials (particularly the active material in the outermost positive electrode layer, which tends to become instable because lithium is extracted from the crystals) is also kept relatively high because the charge depth does not become deep; therefore, the reaction between the positive electrode active materials and the excessive electrolyte solution existing in the separator etc. can be inhibited. Furthermore, the resistance increase rate during overcharge can be improved because the layer in contact with the positive electrode current collector preferably consists only of the positive electrode active material having the highest resistance increase rate during overcharge among the positive electrode active materials or consists of that positive electrode active material and the conductive agent contained in that positive electrode active material. For the above reasons, the tolerance of the battery to overcharging can be improved remarkably.

Herein, the phrase "the layer in contact with the positive electrode current collector preferably consists only of the positive electrode active material having the highest resistance increase rate during overcharge among the positive electrode active materials or consists of that positive electrode active material and the conductive agent contained in that positive electrode active material" is intended to clarify that the layer in contact with the positive electrode current collector contains neither a conductivity enhancing agent nor a binder agent, which are usually mixed with positive electrode active material in the fabricating process of paste-type positive electrodes. In the present specification, the term "conductive agent" means an electrically conductive component contained in the positive electrode active material particles, and the term "conductivity enhancing agent" means an electrically conductive component contained between the positive electrode active material particles.

Although it is preferable that no conductive agent is contained in the layer in contact with the positive electrode current collector from the view point of remarkably improving the tolerance of the battery to overcharging, this may impede the normal charge-discharge reaction depending on the type of positive electrode active material used for the layer in contact with the positive electrode current collector (for example, in the case of the later-described olivine-type lithium phosphate compound). In the case that such a positive electrode active material is to be used, the positive electrode active material particles are allowed to contain a small amount of conductive agent therein so that the advantageous effect resulting from the resistance increase of the layer in contact with the positive electrode current collector during overcharge can be maximized while the normal charge-discharge reaction can occur smoothly.

It should be noted that, even when the positive electrode active material particles contain a conductive agent therein, the proportion of the substances for ensuring electrical conductivity (conductive agent and conductivity enhancing agent) within the positive electrode as a whole is reduced because the need for the conductivity enhancing agent used for ensuring the conductivity between the positive electrode active material particles is eliminated. As the result, the resistance increase rate during overcharge improves remarkably.

In addition, because neither binder agent nor conductivity enhancing agent is contained in the layer in contact with the positive electrode current collector, that layer can be made thinner while the thickness of the layer(s) other than the layer in contact with the positive electrode current collector can be made larger. The other layer(s) than the layer in contact with the positive electrode current collector is (are) generally made of a positive electrode active material that has a greater capacity per unit volume than that of the layer in contact with the positive electrode current collector. Therefore, the construction according to the present invention makes it possible to increase the positive electrode capacity as a whole. What is more, since neither binder agent nor conductivity enhancing agent is contained in the layer in contact with the positive electrode current collector, the filling efficiency of the positive electrode active material in that layer can be improved correspondingly; this also makes it possible to increase the positive electrode capacity as a whole.

Nevertheless, in the case that the positive electrode active material particles are allowed to contain a conductive agent, the advantageous effects of the present invention may not be exhibited sufficiently if the content of the conductive agent is excessively large. For this reason, it is desirable that the proportion of the conductive agent be from about 1 mass % to about 10 mass % with respect to the positive electrode active material in the layer in contact with the positive electrode current collector.

Here, the present invention described above will be described in more detail in comparison with the technique disclosed in JP 2001-338639A (hereinafter simply referred to as the "conventional technique"), which is described above in the "Background of the Invention."

(1) Difference in Reaction Modes Between the Conventional Technique and the Present Invention The conventional technique employs, so to speak, a static test, in which heat generation of a battery is caused by simply sticking a nail into the battery without an accompanying charge reaction. In contrast, the present invention adopts, so to speak, a dynamic test, in which heat generation of a battery is caused by actually charging the battery. Specifically, the differences are as follows.

(I) Although both techniques deal with the problem of thermal runaway caused by heat generation of a battery, the conventional technique does not take a charge-discharge reaction into consideration, so the reaction takes place relatively uniformly in locations other than the location where the nail is stuck. On the other hand, in the present invention, a decomposition reaction of the electrolyte solution occurs due to the actual charging operation, which accompanies gas formation Therefore, the electrode reaction (charge reaction) becomes non-uniform, creating variations in the reaction from one location to another in the electrodes.

(II) The conventional technique is free from the problem of deposited lithium, so it is only necessary to take the thermal stability of the positive electrode into consideration. In contrast, since the present invention involves a charge reaction, the problem of dendrite due to the deposited lithium arises.

(III) Since the conventional technique does not involve a charge reaction, the thermal stability of the active material does not change over time. In contrast, because the present invention involves a charge reaction, the thermal stability of the active material varies greatly depending on the charge depth. Specifically, the greater the charge depth, the lower the stability of the active material.

As discussed in the foregoing (I) and (II), the reaction modes greatly differ between the conventional technique and the present invention, and therefore, it is obvious that a battery design that is effective in the nail penetration test is not necessarily effective also in the overcharging test. Moreover, concerning the issue of thermal stability of active material as discussed in the foregoing (III) as well, the operations and advantageous effects will not be the same since there are differences in static or dynamic concepts between the conventional technique and the present invention.

Figure 2:
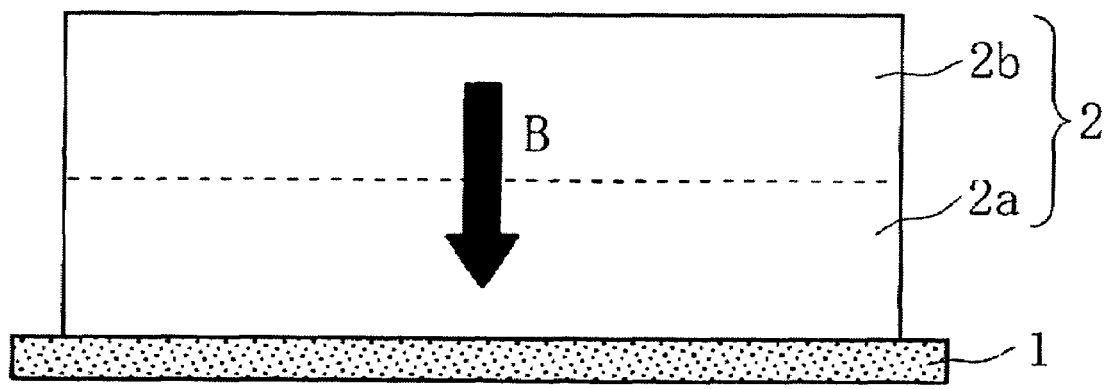
FIG. 2 is a view illustrating a heat transfer passage in the present invention.

(2) Difference in Thermal Transfer Passage Between the Conventional Technique and the Present Invention In the conventional technique, as described in the specification, generated heat spreads over the entire battery through the nail and the aluminum current collector, which have high thermal conductivities and thus serve as heat conductors. That is, as illustrated in FIG. 1, the heat transfers from a lower layer 2a toward an upper layer 2b (in the direction indicated by the arrow A) in a positive electrode active material 2. For this reason, the conventional technique employs a construction in which a material having a higher thermal stability is arranged in the lower layer. On the other hand, in the present invention, what causes a reaction initially when overcharged is lithium deposited on the negative electrode surface. Therefore, as illustrated in FIG. 2, heat transfers from the upper layer 2b toward the lower layer 2a (in the direction indicated by the arrow B) in the positive electrode active material 2. In FIGS. 1 and 2, reference numeral 1 denotes a positive electrode current collector.

Figure 3:
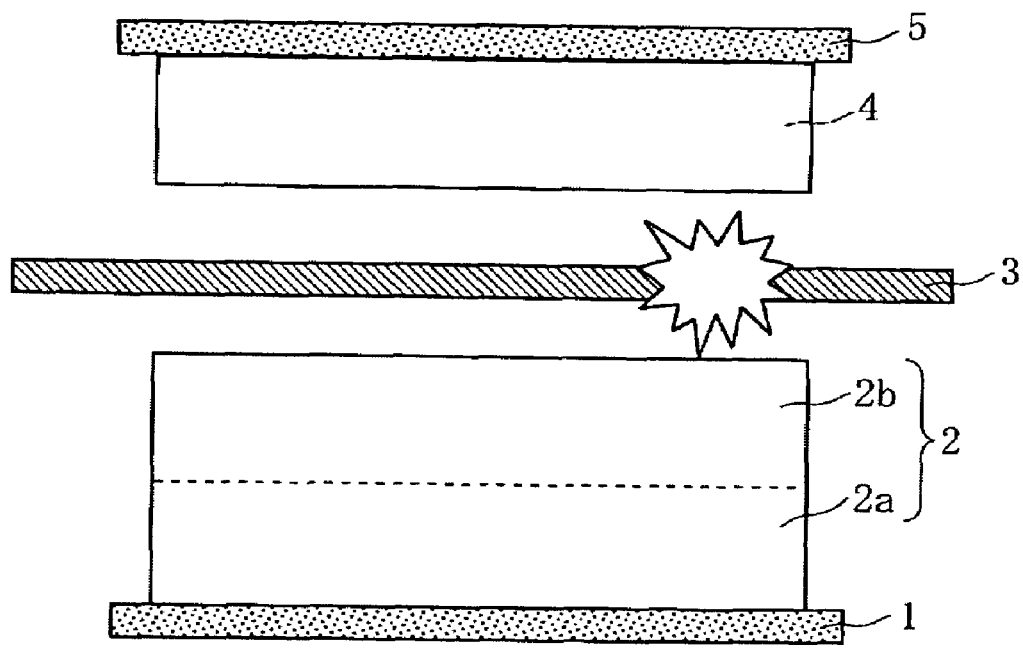
FIG. 3 is a view illustrating a power-generating element of the present invention.

(3) Characteristic Features of the Present Invention Based on the Differences Discussed Above When considering a battery construction that can improve tolerance of a battery to overcharging based on the above-described differences, it is effective to employ a construction in which, as illustrated in FIG. 3, a layer of the positive electrode that is in contact with the positive electrode current collector (i.e., the lower layer 2a in FIG. 3) preferably consists only of a positive electrode active material that has the highest resistance increase rate during overcharge among the positive electrode active materials, or consists of that positive electrode active material and a conductive agent contained in that positive electrode active material. (In FIG. 3, the parts having the same functions as those in FIGS. 1 and 2 are designated by the same reference characters. The same reference characters are also used in FIG. 4, which will be discussed later.)

With the above-described construction, the current collection performance of the upper layer 2b lowers, reducing the amount of lithium deposited on the negative electrode 4, and the charge depth of the active material in the upper layer 2b lessens; as a consequence, a thermal runaway reaction does not occur easily. Thus, it is possible to reduce the total amount of heat produced within the battery and prevent the thermal stability of the active material at the surface from degrading.

Moreover, since the positive electrode preferably consists only of the positive electrode active material having the highest resistance increase rate during overcharge among the positive electrode active materials or consists of that positive electrode active material and the conductive agent contained in that positive electrode active material, it is possible to sufficiently improve the resistance increase rate during overcharge and reduce the thickness of the layer in contact with the positive electrode current collector. Consequently, the energy density of the battery can be improved.

Thus, the improvement in the positive electrode structure in the above-described manner makes it possible to prevent the deposition of lithium and reduce the total amount of heat produced in the battery, while improving the energy density of the battery. As a result, the tolerance of the battery to overcharging can be improved remarkably.

In the non-aqueous electrolyte battery of the invention, the thickness of the layer in contact with the positive electrode current collector may be equal to or less than the secondary particle size of the positive electrode active material particles in that layer.

As described above, positive electrode active materials having high resistance increase rates during overcharge (such as spinel-type lithium manganese oxides and olivine-type lithium phosphate compounds) generally show less discharge capacities per unit mass (lower energy densities) than positive electrode active materials having low resistance increase rates during overcharge (such as lithium cobalt oxide). With this in mind, if the thickness of the layer being in contact with the positive electrode current collector is restricted to equal to or less than the secondary particle size of the positive electrode active material particles used for that layer, the proportion of the positive electrode active material having a high resistance increase rate during overcharge can be lowered relative to the entire positive electrode, and correspondingly the proportion of the positive electrode active material having a low resistance increase rate during overcharge increases. As a consequence, the tolerance of the battery to overcharging can be improved remarkably while the energy density is prevented from degrading.

In the non-aqueous electrolyte battery of the invention, the positive electrode active material in the layer in contact with the positive electrode current collector may comprise a spinel-type lithium manganese oxide.

The spinel-type lithium manganese oxide deintercalates most of the lithium ions from the interior of the crystals when charged to 4.2 V, so almost no lithium ions can be extracted from the interior of the crystals even when overcharged beyond 4.2 V; therefore, the resistance increase during overcharge becomes very high. Accordingly, the advantageous effects of the invention can be exerted more effectively.

In the non-aqueous electrolyte battery of the invention, the positive electrode active material in the layer in contact with the positive electrode current collector may comprise an olivine-type lithium phosphate compound represented by the general formula $LiMPO_4$, where M is at least one element selected from the group consisting of Fe, Ni, and Mn.

The olivine-type lithium phosphate compound shows a greater increase in direct current resistance than the spinel-type lithium manganese oxide at the time when lithium ions are extracted from the interior of the crystals. In addition, since the olivine-type lithium phosphate compound exhibits a lower potential than the spinel-type lithium manganese oxide when almost all the lithium ions have been extracted from the interior of the crystals, the above-described advantageous effects emerge before reaching the charge depth at which the lithium cobalt oxide or the like existing near the surface side of the positive electrode starts to degrade in terms of safety. Thus, the advantageous effects of the present invention are exerted more effectively.

In the non-aqueous electrolyte battery of the invention, the positive electrode active material-layer stack may contain lithium cobalt oxide as a positive electrode active material.

Lithium cobalt oxide has a large capacity per unit volume. Therefore, allowing the positive electrode active material to contain lithium cobalt oxide as in the foregoing construction makes it possible to increase the capacity of the battery.

In the non-aqueous electrolyte battery of the invention, the positive electrode active material-layer stack may contain lithium cobalt oxide as a positive electrode active material, and the total mass of the lithium cobalt oxide may be greater than the total mass of the spinel-type lithium manganese oxide in the positive electrode active material-layer stack.

When, as in the foregoing construction, the positive electrode active material-layer stack contains lithium cobalt oxide as a positive electrode active material and the total mass of the lithium cobalt oxide is restricted to be greater than the total mass of the spinel-type lithium manganese oxide, the energy density of the battery as a whole can be increased because the lithium cobalt oxide has a greater specific capacity than the spinel-type lithium manganese oxide.

In the non-aqueous electrolyte battery of the invention, the positive electrode active material-layer stack contains lithium cobalt oxide as a positive electrode active material, and the total mass of the lithium cobalt oxide is greater than the total mass of the olivine-type lithium phosphate compound in the positive electrode active material-layer stack.

When, as in the foregoing construction, the positive electrode active material-layer stack contains lithium cobalt oxide as a positive electrode active material and the total mass of the lithium cobalt oxide is restricted to be greater than the total mass of the olivine-type lithium phosphate compound, the energy density of the battery as a whole can be increased because the lithium cobalt oxide has a greater specific capacity than the olivine-type lithium phosphate compound.

In the non-aqueous electrolyte battery of the invention, the lithium cobalt oxide may exist in the outermost positive electrode layer.

When the lithium cobalt oxide exists in the outermost positive electrode layer, the current collection performance of the lithium cobalt oxide lowers further and the lithium cobalt oxide is inhibited from being charged to the charge depth that should be reached otherwise. Thus, the amount of lithium deintercalated from the lithium cobalt oxide, which contains a large amount of lithium even in the overcharge region, decreases considerably, and accordingly the amount of heat produced from the reaction between the electrolyte solution and the lithium deposited on the negative electrode reduces remarkably. Moreover, thermal stability of the lithium cobalt oxide is also kept relatively high.

In the non-aqueous electrolyte battery of the invention, the separator may have a meltdown temperature of 180° C. or higher.

The use of separator having a meltdown temperature of 180° C. or higher can prevent internal short circuits, and therefore, together with adopting the foregoing positive electrode structure according to the present invention, the tolerance of the battery to overcharging can improve further. Specifically, the reasons are as follows.

Figure 4:
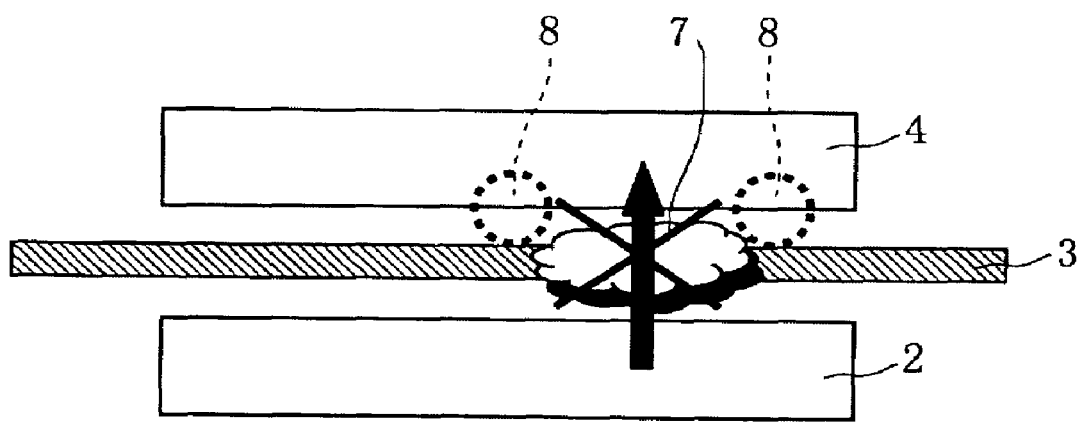
FIG. 4 is a view illustrating the state of a local exothermic reaction.

When the current collection performance between the positive and negative electrodes decreases due to gas formation originating from the decomposition of the electrolyte solution (i.e., the reaction area decreases), or the amount of the electrolyte solution in the electrodes decreases due to the reaction of the electrolyte solution, an exothermic reaction occurs locally in peripheral regions in which such behavior takes place (locations 8 in FIG. 4, wherein the behavior takes place at location 7). It is believed that the heat originating from the deposited lithium alone can elevate the temperature to about 165° C. locally. Thereby, the separator may melt down (commonly-used polyethylene separators melt down at about 165° C.) or undergo heat-shrinkage, causing internal short circuits. To overcome this problem, the use of the separator having a meltdown temperature of 180° C. or higher (a separator having a meltdown temperature higher than that of commonly used polyethylene microporous films) is effective to prevent the breakage or heat-shrinkage of the separator further even when the local exothermic reaction occurs, and therefore further suppress internal short circuiting of the battery.

In addition, it should be noted that the conventional technique described previously does not take the problems of the meltdown and heat shrinkage of the separator into consideration and therefore does not exhibit the above-described advantageous effect.

In the non-aqueous electrolyte battery of the invention, the separator may be an electron-beam cross-linked separator, in which cross-linking is effected by irradiating a microporous polyethylene film with an electron beam.

Although the electron-beam cross-linked separator shows a higher meltdown temperature than non-cross-linked polyethylene separators, it does not at all affect other physical properties of the separator (for example, shutdown temperature, etc.). Consequently, meltdown of the separator can be prevented while the shutdown function is exhibited sufficiently.

In the non-aqueous electrolyte battery of the invention, the separator may be made of a microporous polyethylene film and a microporous film having a melting point of 200° C. or higher, the microporous film being stacked over the microporous polyethylene film.

The use of the heat-proof layer-stacked separator as described above can attain a further higher separator meltdown temperature, preventing separator meltdown more effectively.

In the non-aqueous electrolyte battery of the invention, the microporous film having a melting point of 200° C. or higher may be a microporous film made of polyamide, polyimide, or polyamideimide.

The microporous film made of polyamide, polyimide, or polyamideimide is offered as an illustrative example of the microporous film having a melting point of 200° C. or higher, but this is not intended to be limiting of the present invention.

In the non-aqueous electrolyte battery of the invention, the microporous film made of polyamide, polyimide, or polyamideimide can have a melting point of from 200° C. to 400° C.

The non-aqueous electrolyte battery of the invention can further comprise a battery case for accommodating a power-generating element containing the positive and negative electrodes and the separator, the battery case being flexible.

In addition to the function to increase resistance because of the extraction of lithium ions from the interior of the crystals during charging as discussed above, the olivine-type lithium phosphate compound shows a weaker capability of decomposing the electrolyte solution in the oxidation state than both the spinel-type lithium manganese oxide and lithium cobalt oxide, and also produces a lower amount of gas originating from the decomposition of the electrolyte solution in the overcharged state. For this reason, the use of the olivine-type lithium phosphate compound as a positive electrode active material can also prevent the problem of short circuiting within the battery even when a flexible battery case is used because the problem of swelling of the battery does not easily occur. An example of the battery case that is flexible includes, but is not limited to, an aluminum laminate battery case.

The present invention also provides a method of manufacturing the above-described non-aqueous electrolyte battery. The battery includes a positive electrode, a negative electrode, and a separator. The positive electrode has a positive electrode active material-layer stack formed on a positive electrode current collector. The positive electrode active material-layer stack comprises a plurality of positive electrode active material layers containing a plurality of positive electrode active materials. The negative electrode includes a negative electrode active material layer. The separator is interposed between the electrodes. The method comprises: a first step of causing particles of a positive electrode active material having the highest resistance increase rate among the plurality of positive electrode active materials to adhere to a surface of the positive electrode current collector using a cold spraying method, to form one of the positive electrode active material layers; a second step of applying another one or more of the plurality of positive electrode active materials onto a surface of the one of the positive electrode active material layers to form one or more other positive electrode active material layers, whereby the positive electrode is prepared; and a third step of arranging the positive electrode and the negative electrode and interposing the separator therebetween.

In the above-described method, the positive electrode active material having the highest resistance increase rate during overcharge is adhered to the positive electrode current collector surface by cold spraying; in other words, particles of that positive electrode active material are caused to collide with the positive electrode current collector at such a high velocity that the particles are forced to slam into the positive electrode current collector due to the energy of the collision, whereby the positive electrode active material adheres to the positive electrode current collector surface. The use of this method eliminates the need for a conductivity enhancing agent and binder agent, making it possible to form the positive electrode active material layer into a thin film. Consequently, the tolerance of the battery to overcharging can be improved remarkably while the energy density is prevented from degrading.

It should be noted that the particles of the positive electrode active material need not necessarily be made only of the positive electrode active material but may also be made of the positive electrode active material and a conductive agent.

PREFERRED EMBODIMENTS

Hereinbelow, the present invention is described in further detail based on preferred embodiments thereof. It should not be construed, however, that the present invention is limited to the following preferred embodiments. Various changes and modifications are possible without departing from the scope of the invention.

Preparation of Positive Electrode

Using cold spraying, a first positive electrode active material layer made of olivine-type lithium iron phosphate $LiFePO_4$ (hereinafter also abbreviated as "LFP"), in which 5% of carbon was added as a conductive agent at the time of baking, was formed on a surface of a positive electrode current collector made of aluminum. The reason why 5% of carbon was added as a conductive agent in baking is that, since the olivine-type lithium phosphate compound shows low electrical conductivity and is poor in load characteristics, good battery performance is ensured by providing conductive paths by the carbon in the secondary particles at the stage of baking of the positive electrode active material.

The cold spraying is a technique of forming a film, in which the material for the positive electrode active material (LFP) is, without being fused or being made into a gas, caused to collide with a substrate material (positive electrode current collector) along with an inert gas in a supersonic stream while the particles remain in the solid state. With this method, the positive electrode active material particles are accelerated to a supersonic velocity undergo plastic deformation when colliding with a substrate material (positive electrode current collector), thereby forming a dense film on the surface of the positive electrode current collector. Since a thin film is formed according to such a principle, the need for a binder agent and a conductivity enhancing agent is eliminated, and the first positive electrode active material layer can be made into a thin film. In addition, film deposition can be carried out at a lower temperature (250° C. to 500° C.) in comparison with other thermal spraying techniques, and therefore, it is possible to minimize changes in the properties of the material for positive electrode active material layer because of heat.

The configuration of a cold spraying apparatus and the manufacturing method of the first positive electrode active material layer using the cold spraying technique are described in the following.

Configuration of Cold Spraying Apparatus

Figure 5:
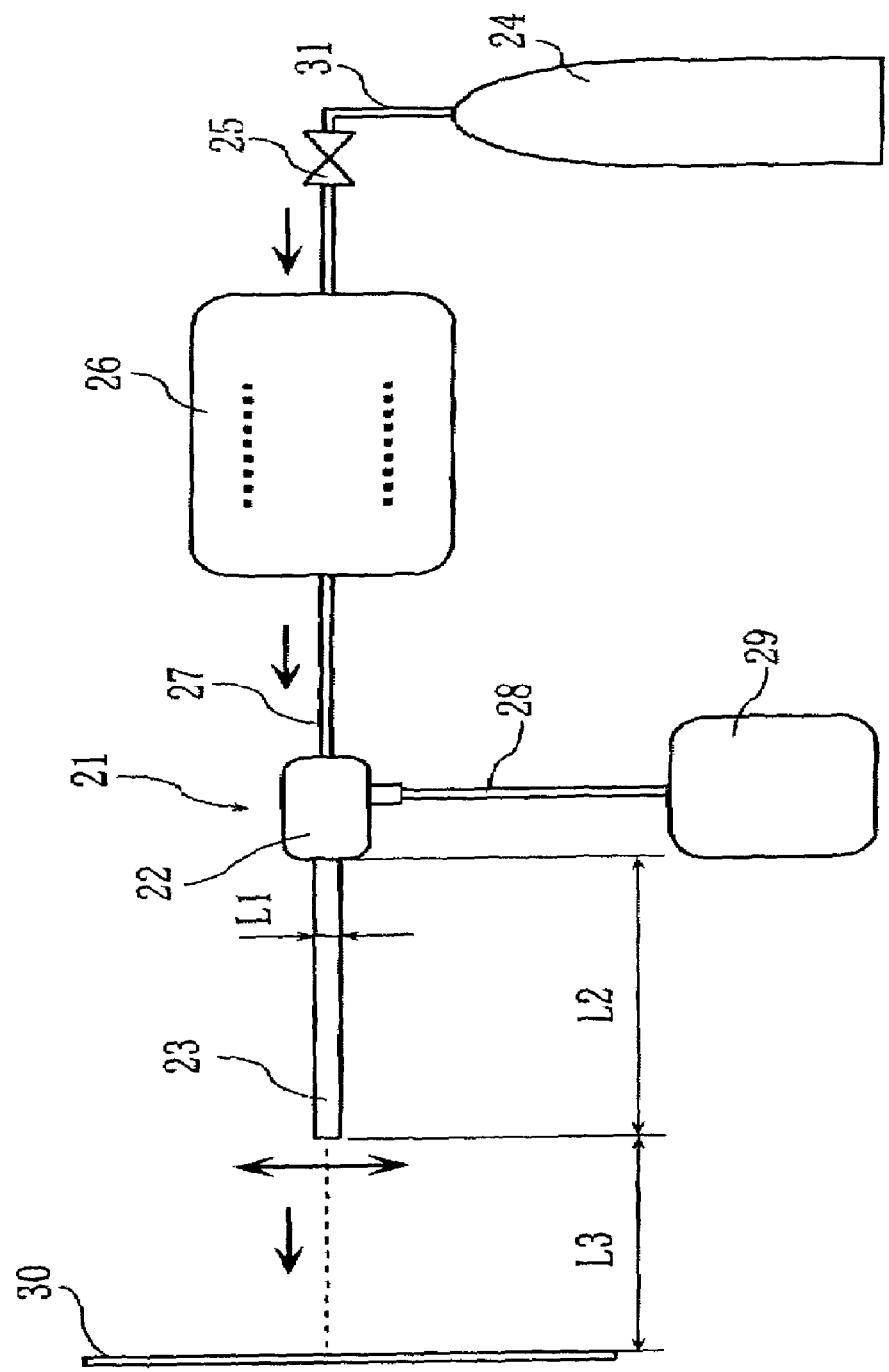
FIG. 5 is a view illustrating the configuration of a cold spraying apparatus.

As illustrated in FIG. 5, the cold spraying apparatus has a Laval nozzle 21. The Laval nozzle 21 has a nozzle main portion 23 for applying positive electrode active material particles (particles of olivine-type lithium iron phosphate in this embodiment) to an aluminum foil (positive electrode current collector) and a mixing portion 22 for mixing the positive electrode active material particles with a carrier gas and supplying the mixture to the nozzle main portion 23. The carrier gas is supplied from a gas ($N_2$ gas) cylinder 24 via a pipe line 31 to a heater 26, is heated to 270° C. by the heater 26, and is supplied to the mixing portion 22. On the other hand, the positive electrode active material particles are supplied from a powder supply feeder 29 via a pipe line 28 to the mixing portion 22. The inner diameter L1 of the nozzle main portion 23 is 8 mm, the length L2 of the nozzle main portion 23 is 200 mm, and the distance L2 between the tip of the nozzle main portion 23 and an aluminum foil 30, which is the substrate material, is 15 mm. In FIG. 5, reference numeral 25 denotes a valve.

Fabrication Method of First Positive Electrode Active Material Layer

The first positive electrode active material layer was manufactured through following process steps.

1. The valve 25 is opened so that a carrier gas was supplied from the gas cylinder 24 via the pipe line 31 to the heater 26. The carrier gas is heated to 270° C. by the heater 26 and thereafter supplied to the mixing portion 22. Simultaneously, powder of an olivine-type lithium iron phosphate (being represented as $LiFePO_4$, containing 5% of carbon as a conductive agent, which was added at the time of sintering, and having an average particle size of 5 μm) is fed into the powder supply feeder 29. Thereby, the olivine-type lithium iron phosphate powder is supplied from the powder supply feeder 29 via the pipe line 28 to the mixing portion 22. Thus, the olivine-type lithium iron phosphate powder accelerated at the Laval nozzle 21 is discharged from the nozzle main portion 23 together with the carrier gas.

Figure 6:
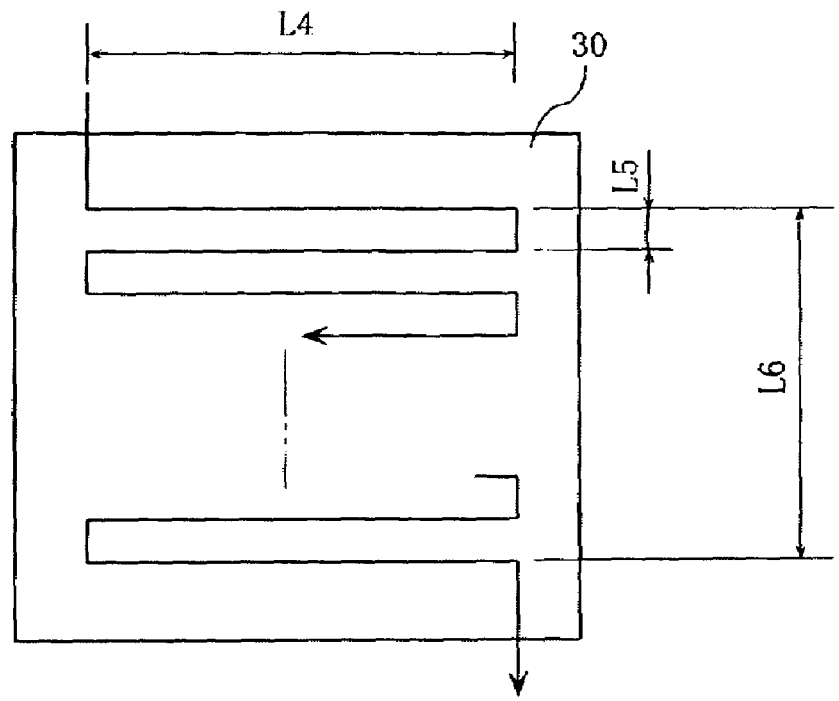
FIG. 6 is a plan view illustrating a coating method using the cold spraying apparatus.

2. The Laval nozzle 21 is actuated by a robot arm (not shown) to form a thin film of the olivine-type lithium iron phosphate on one side of the aluminum foil 30, which is the substrate material. As illustrated in FIG. 6, the Laval nozzle 21 is operated to follow a zig-zag patterned path such that the traverse pitch L5 becomes 2 mm within an area with a width L4 of 60 mm and a height L6 of 58 mm. While the traverse pitch L5 is 2 mm, the inner diameter L1 of the nozzle main portion 23 is set at 8 mm as mentioned above; this means that the thin film of the olivine-type lithium iron phosphate is formed in an overlapped manner except for the end portions of the aluminum foil 30.

3. After the formation of the thin film of the olivine-type lithium iron phosphate is finished on one side of the aluminum foil 30, the other side of the aluminum foil 30 is coated with a thin film of the olivine-type lithium iron phosphate in the same manner.

4. The supply of the powder and the supply of the gas are stopped, and the aluminum foil 30 is taken out of the apparatus.

Through the above-described process steps, a first positive electrode active material layer (olivine-type lithium iron phosphate thin film) was formed on each of the sides of the positive electrode current collector made of an aluminum foil.

The conditions of the film formation by the cold spraying method are shown in Table 1 below.

TABLE 1

| Carrier gas | $N_2$ | Heat exchanger temperature | 600° C. |
|---|---|---|---|
| Gas pressure (nozzle inlet) | 0.8 MP | Carrier gas pressure | 0.5 MPa |
| Gas temperature (nozzle inlet) | 270° C. | Carrier gas flow rate | 10 L/min. |
| Distance between aluminum foil and tip of nozzle main portion | 15 mm | Inner pressure of powder feeder | 0.1 MPa |

TABLE 1-continued

| Nozzle length (cylindrical portion) | 200 mm | Motor revolution | 700 rpm |
| Nozzle moving velocity | 10 mm/S | Amount of power supplied | 15 g |
| Nozzle inner diameter | 8 mm | Traverse pitch | 2 mm |

Next, a second positive electrode active material layer was formed on the surface of the first positive electrode active material layer in the following manner. First, lithium cobalt oxide (hereinafter also abbreviated as "LCO"), used as a positive electrode active material, and SP300 (conductive agent, made by Nippon Graphite Industries, Ltd.) and acetylene black, used as carbon conductive agents, were mixed together at a mass ratio of 92:3:2 to prepare a positive electrode mixture powder. Next, 200 g of the resultant powder was charged into a mixer (for example, a mechanofusion system AM-15F made by Hosokawa Micron Corp.), and the mixer was operated at a rate of 1500 rpm for 10 minutes to cause compression, shock, and shear actions while mixing, to thus prepare a positive electrode active material mixture. Subsequently, the resultant positive electrode active material mixture and a fluoropolymer-based binder agent (PVDF) were mixed at a mass ratio of 97:3 in N-methyl-2-pyrrolidone (NMP) solvent to prepare a positive electrode slurry. Thereafter, the positive electrode slurry was applied onto the surface of the first positive electrode active material layer, and the resultant material was then dried and pressure-rolled. Thus, the second positive electrode active material layer was formed on the surface of the first positive electrode active material layer.

The positive electrode was prepared through the above-described steps. It is desirable that the mass ratio of the positive electrode active materials LCO:LFP in the positive electrode be within the range of from 90:10 to 99.99:0.01.

Preparation of Negative Electrode

A carbon material (graphite), CMC (carboxymethylcellulose sodium), and SBR (styrene-butadiene rubber) were mixed in an aqueous solution at a mass ratio of 98:1:1 to prepare a negative electrode slurry. Thereafter, the negative electrode slurry was applied onto both sides of a copper foil serving as a negative electrode current collector, and the resultant material was then dried and rolled. Thus, a negative electrode was prepared.

Preparation of Non-Aqueous Electrolyte Solution $LiPF_6$ was dissolved at a concentration of 1.0 mole/L in a mixed solvent of 3:7 volume ratio of ethylene carbonate (EC) and diethyl carbonate (DEC) to prepare a non-aqueous electrolyte solution.

Preparation of Separator

A separator was prepared by irradiating a microporous film made of commonly used polyethylene (hereinafter also abbreviated as "PE") with an electron beam. When irradiating the commonly used separator with an electron beam in this way, the PE forms a cross-linked structure, so that an electron beam cross-linked separator can be obtained. The film thickness of the separator was 16 μm.

Construction of Battery

Lead terminals were attached to the positive and negative electrodes, and the positive and negative electrodes were wound in a spiral form with the separator interposed therebetween. The wound electrodes were then pressed into a flat shape to obtain a power-generating element, and thereafter, the power-generating element was accommodated into an enclosing space made by an aluminum laminate film serving as a battery case. Then, the non-aqueous electrolyte solution was filled into the space, and thereafter the battery case was sealed by welding the aluminum laminate film. Thus, a battery was fabricated.

Preliminary Experiment 1

Shutdown temperatures (hereinafter also referred to as "SD temperature") and meltdown temperatures (hereinafter also referred to as "MD temperature") were investigated with the foregoing electron beam cross-linked separator (used in later-described Reference Batteries A1 and W1), a heat-proof layer-stacked separator (used in later-described Reference Batteries A2 and W), and an ordinary separator (used in later-described Batteries A3, A4, B, C, D, W3, X, Y, and Z). The results are shown in Table 2. The method of fabricating test cells, the evaluation equipment, and the method of measuring the SD temperatures and the MD temperatures were as follows.

Fabrication Method of Test Cell

Figure 7:
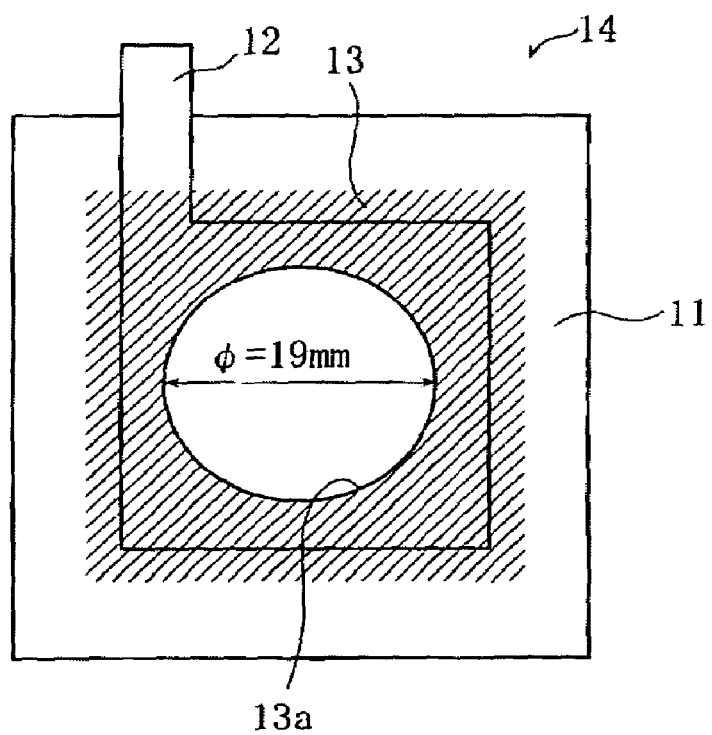
FIG. 7 is an exploded plan view of a test cell for evaluating shutdown temperature and meltdown temperature of a separator.
Figure 8:
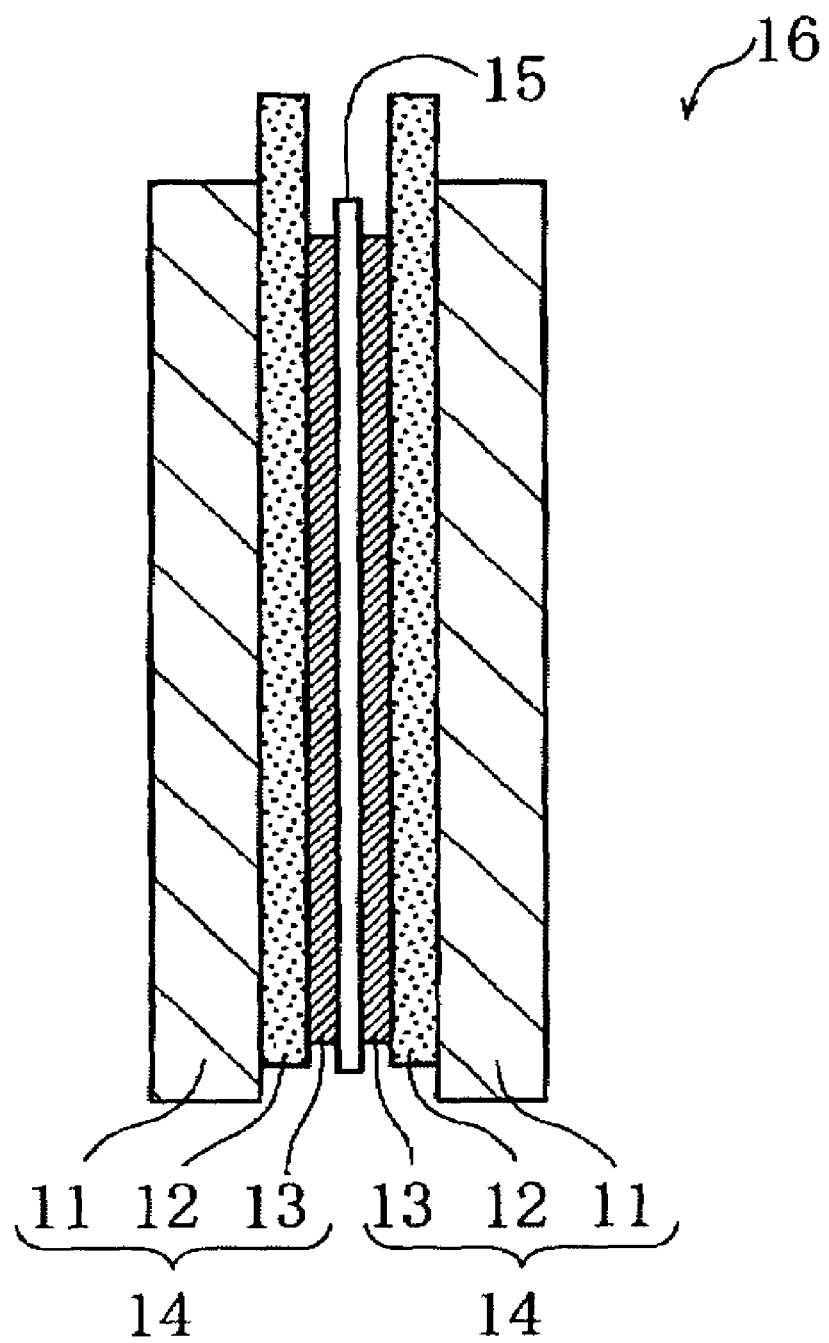
FIG. 8 is a cross-sectional view of the test cell.

As illustrated in FIG. 7, a substantially square-shaped aluminum foil 12 (thickness: 15 μm) was disposed on one side of a glass substrate 11, and a poly-imide tape 13 was affixed to and covered the surface of the aluminum foil 12 to produce a cell piece 14. Two cell pieces 14 were prepared, and as illustrated in FIG. 8, a sample of the foregoing separators 15 was placed between the two cell pieces 14, 14, which were fastened by clips, to prepare a test cell 16.

The poly-imide tape 13 was affixed to prevent short-circuiting due to burrs, and a 19-mm diameter hole 13a was formed approximately at the center of the poly-imide tape 13.

The electrolyte solution used for the test cell 16 was γ-butyrolactone in which $LiBF_4$ as a solute was dissolved at a concentration of 0.5 mole/liter and to which 1 mass % of trioctyl phosphate as a surfactant was added to ensure wettability. This electrolyte solution was used taking into consideration the stability and boiling point of the solvent under heating to 200° C. or higher.

Evaluation Equipment

Electric furnace AMF-10 and digital temperature controller AMF-2P (temperature accuracy: ±1° C./min), made by Asahi Rika Seikakusho Co., Ltd.

LCR meter 3522 made by Hioki E. E. Corp.

Measurement Method of SD (Shutdown) Temperature and MD (Meltdown) Temperature

Using the foregoing test cell 16, the physical properties of the separators were measured under the condition in which a temperature elevation rate was fast (20° C./min, assuming the actual overcharge condition).

The measurement was conducted as follows. Changes in the resistance values between the electrodes were measured while elevating the temperature at the foregoing temperature elevation rate from room temperature to about 210° C. A temperature obtained at the time when the resistance value greatly increased (due to melting of the fuse component, i.e., low-melting point component, which causes micropores in the separator to be clogged) was determined as the SD temperature, and a temperature obtained at the time when the resistance value dropped (due to melting down of the separator, which causes the electrodes to come into contact with each other) was determined as the MD temperature.

TABLE 2

| Separator type | SD temperature | MD temperature |
| --- | --- | --- |
| Electron beam cross-linked separator | 140° C. | 185° C. |

TABLE 2-continued

| Separator type | SD temperature | MD temperature |
|---|---|---|
| Heat-proof layer stacked separator | 140° C. | 200° C. or higher |
| Conventional separator | 140° C. | 165° C. |

Table 2 clearly shows that all the separators had an SD temperature of 140° C. On the other hand, it is appreciated that the ordinary separator showed an MD temperature of 165° C., while the electron beam cross-linked separator and the heat-proof layer-stacked separator exhibited higher MD temperatures, 185° C. and 200° C. or higher, respectively.

Preliminary Experiment 2

REFERENCE EXAMPLE A1

A battery was fabricated in the same manner as in the above-described embodiment except that the first positive electrode active material layer was prepared as follows. A positive electrode slurry was prepared in the same manner as in preparing the second positive electrode active material layer except for the use of LFP as the positive electrode active material, and the resultant positive electrode slurry was applied onto a surface of an aluminum foil. The resultant material was then dried and pressure-rolled to form the first positive electrode active material layer. It should be noted that the olivine-type lithium phosphate compound shows poor conductivity and is poor in load characteristics. For that reason, the secondary particles of the olivine-type lithium phosphate compound were allowed to contain 5% of a carbon component at the baking stage of the positive electrode active material, in order to provide conductive paths in the secondary particles by the carbon so that sufficient battery performance can be ensured. The above-described battery had a design capacity of 780 mAh, and the mass ratio of LCO and LFP was 75:25.

The battery fabricated in this manner is hereinafter referred to as Reference Battery A1.

REFERENCE EXAMPLE A2

A battery was fabricated in the same manner as in Reference Example A1 above, except that a heat-proof layer-stacked separator was used in place of the electron beam cross-linked separator.

The battery fabricated in this manner is hereinafter referred to as Reference Battery A2.

The heat-proof layer-stacked separator was fabricated in the following manner.

First, polyamide (PA), which is a water-insoluble, heat-resistant material, was dissolved in N-methyl-2-pyrrolidone (NMP), which is a water-soluble solvent, and the resultant solution was subjected to low-temperature condensation polymerization to prepare a polyamide-doped solution. Next, this doped solution was coated to a predetermined thickness on one side of a polyethylene (PE) microporous film, which is a substrate material, and thereafter the coated substrate was immersed in water to remove the water-soluble NMP solvent and to deposit and solidify the water-insoluble polyamide. Thus, a microporous polyamide film was formed on one side of the polyethylene film. Then, the microporous polyamide film was dried at a temperature lower than the melting point of polyethylene (specifically, at 80° C.) to remove water therefrom, and thus, a separator comprising a stack of microporous films was obtained. It should be noted that the number and size of pores in the polyamide film can be varied by varying the concentration of polyamide in the water-soluble solvent. The film thickness of the separator was 18 μm (PE layer: 16 μm, PA layer: 2 μm).

REFERENCE EXAMPLE A3

A battery was fabricated in the same manner as in Reference Example A1 above, except that an ordinary separator was used in place of the electron beam cross-linked separator.

The battery fabricated in this manner is hereinafter referred to as Reference Battery A3.

REFERENCE EXAMPLE A4

A battery was fabricated in the same manners as in Reference Example A3 above, except that a mixture of LCO and LFP was used in place of LCO alone as the positive electrode active material of the second positive electrode active material layer (the surface-side layer of the positive electrode active material layers) in the positive electrode.

The battery fabricated in this manner is hereinafter referred to as Reference Battery A4.

REFERENCE EXAMPLES W1 TO W3

Batteries were fabricated in the same manners as in Reference Examples A1 to A3 above, except that a single layer structure was adopted for the positive electrode active material-layer stack, instead of the double layer structure (a mixture of LCO and LMO was used as the positive electrode active material).

The batteries fabricated in this manner are hereinafter referred to as Reference Batteries W1 to W3, respectively.

Experiment

Reference Batteries A1 to A4 and W1 to W3 were studied for their tolerance to overcharging. The results are shown in Table 3. The conditions of the experiment were as follows. Samples of the batteries were subjected to a charge test using circuits that charge the batteries, with a current of 750 mA being defined as 1.0 It, at currents of 1.0 It, 2.0 It, 3.0 It, and 4.0 It until the battery voltages reached 12 V, and then the batteries were charged at a constant voltage (without the lower current limit). After a voltage of 12 V was reached, the charging was continued for 3 hours. In the present experiment, highest battery surface temperatures reached (° C.) were measured with many samples of the batteries, in addition to numbers of occurrences of short circuits and charge depths (%) at the time of SD activation.

Usually, a battery (battery pack) is provided with a protection circuit or a protective device such as a PTC device so that the safety of the battery in abnormal conditions can be ensured. In unit cells as well, various safety mechanisms are provided such as a separator shutdown function (the function to insulate the positive and negative electrodes from each other by heat-clogging pores in a microporous film) and additives to the electrolyte solution so that the safety can be ensured even without the protection circuit and the like. With this in mind, when the behaviors of the batteries on overcharge were studied in the above-described experiment, such materials and mechanisms for improving the safety were eliminated except for the separator shutdown function in order to prove the superiority in safety of the batteries of the invention.

TABLE 3

| Battery | Positive electrode structure | Positive electrode active material | | Separator | Number of batteries with short circuit Charge depth at SD activation (%), Highest battery surface temperature (° C.) | | | |
|---|---|---|---|---|---|---|---|---|
| | | Second positive electrode active material layer (Surface side) | First positive electrode active material layer (Current collector side) | | 1.0It Overcharge | 2.0It Overcharge | 3.0It Overcharge | 4.0It Overcharge |
| Reference Battery A1 | Double layer | LCO | LFP | Electron beam cross-linked separator | No 153%, 86° C. | No 152%, 91° C. | No 147%, 89° C. | 1/3 159%, 113° C. |
| Reference Battery A2 | Double layer | LCO | LFP | Heat-proof-layer stacked separator | No 152%, 87° C. | No 151%, 88° C. | No 148%, 87° C. | 1/3 158%, 121° C. |
| Reference Battery A3 | Double layer | LCO | LFP | Ordinary separator | No 151%, 87° C. | No 151%, 85° C. | No 149%, 93° C. | 2/2 157% |
| Reference Battery A4 | Double layer | LCO/LFP mixture | LFP | Ordinary separator | No 150%, 91° C. | No 150%, 90° C. | No 150%, 95° C. | 2/2 158% |
| Reference Battery W1 | Single layer | LCO/LFP mixture | | Electron beam cross-linked separator | No 161%, 116° C. | 1/2 160%, 128° C. | 2/2 159% | — |
| Reference Battery W2 | Single layer | LCO/LFP mixture | | Heat-proof-layer stacked separator | No 160%, 123° C. | 1/2 159%, 126° C. | 2/2 160% | — |
| Reference Battery W3 | Single layer | LCO/LFP mixture | | Ordinary separator | No 160%, 121° C. | 2/2 158% | 2/2 159% | — |

The mass ratio of LCO (LiCoO$_2$) and LFP (LiFePO$_4$) in the positive electrode active material was 75:25 for all the batteries. Charge depth at SD activation was obtained by calculating charge capacity ratios up to SD activation with respect to the design capacity 780 mA.

Highest battery surface temperature was not measured for all the batteries.

Analysis of Positive Electrode Structure

Table 2 clearly demonstrates that, with Reference Batteries A1 to A4, only one sample from Battery A1 and two samples from each of A3 and A4 caused short circuits on overcharge at 4.0 It (none of the samples from Reference Battery A2 caused short circuits). In contrast, many samples of Reference Batteries W1 to W3 caused short circuits on overcharge at 2.0 It, and all the samples thereof caused short circuits on overcharge at 4.0 It.

As for their charge depths at which the SD behavior starts to take place (hereinafter also referred to as "charge depth at SD activation"), it will be appreciated clearly from Table 3 that, in Reference Batteries W1 to W3, which used a mere mixture of LMO and LCO as the positive electrode active material, the SD behavior did not start to take place until the charge depth became about 160%; in contrast, in Reference Batteries A1 to A4, in which the positive electrode active materials were formed into a double-layer structure and LFP was used for the first positive electrode active material layer, the SD behavior started at a stage at which the charge depth was about 10% lower than that for Reference Batteries W1 to W3.

Here, it is believed that Reference Batteries A1 to A4 exhibited improvements in their tolerance to overcharging over Reference Batteries W1 to W3 due to the following reasons.

Reference Batteries A1 to A4 use the LFP active material for the first positive electrode active material layer (the layer directly in contact with the positive electrode current collector). The LFP active material deintercalates most of the lithium ions from the interior of the crystals during the charge to 4.2 V, so almost no lithium ions can be extracted from the interior of the crystals even when overcharged beyond 4.2 V. Therefore, the resistance increase during overcharge becomes significantly large. When the resistance increase during overcharge of the first positive electrode active material layer is very large in this way, the current collection performance in the second positive electrode active material layer, which is made of the LCO active material, degrades. Consequently, the LCO active material in the second positive electrode active material layer is inhibited from being charged to the charge depth that would be reached otherwise. Accordingly, the amount of the lithium deintercalated from the positive electrode in the overcharge region (especially the amount of lithium deintercalated from LCO) reduces, and the total amount of the lithium deposited on the negative electrode correspondingly reduces. Consequently, the amount of heat produced due to the reaction between the electrolyte solution and the lithium deposited on the negative electrode reduces. Moreover, thermal stability of the positive electrode active materials (particularly thermal stability of LCO that becomes instable because of the extraction of lithium from the crystals) is also kept relatively high because the charge depth does not become deeper.

More details are as follows. LCO deintercalates only about 60% of the lithium ions from the interior of the crystals when charged to 4.2 V, and the remaining about 40% of the lithium ions can be extracted from the interior of the crystals during overcharge. Therefore, the remaining portion of the lithium ions is not inserted into the negative electrode but is deposited on the negative electrode surface. In particular, when high-rate charging is conducted, the lithium-ion accepting capability reduces in the negative electrode, so the deposited lithium increases further. Moreover, since tetravalent cobalt cannot exist stably, $CoO_2$ is unable to exist in a stable state, and it releases oxygen from the interior of the crystals during overcharge and changes into a more stable crystal form. At this stage, if an electrolyte solution exists, it tends to cause a violent exothermic reaction, which becomes a cause of thermal runaway. Furthermore, the oxygen released from the positive electrode helps the inflammable gas produced by the decomposition of the electrolyte solution to catch fire more easily.

In view of this, if the LFP active material, which results in a significant resistance increase during overcharge, is used for the first positive electrode active material layer, as in Reference Batteries A1 to A4, the current collection performance of the second positive electrode active material layer made of the LCO active material is lowered and the LCO active material is inhibited from being charged easily, and thereby the amount of the lithium deintercalated from LCO decreases in the overcharge region. As a result, the total amount of the lithium deposited on the negative electrode decreases, and the amount of heat produced due to the reaction between the electrolyte solution and the lithium deposited on the negative electrode accordingly decreases. Moreover, thermal stability of LCO is also kept relatively high since the charge depth does not become deeper, leading to a decrease in the amount of oxygen generated. Thus, the safety of the battery during overcharge improves due to the mechanism discussed above.

Analysis of Separator Structure (1) Comparison Between Ordinary Separator and Electron Beam Cross-linked Separator and Heat-proof Layer-stacked Separator In the case that the overcharge current was 4.0 It or higher, short circuits occurred in all the samples of Reference Batteries A3 and A4, which used ordinary separators, because of, for example, the way in which the excessive voltage is placed or the imbalance in heat generation. However, few short circuits occurred in the samples of Reference Batteries A1 and A2, which used electron beam cross-linked separators and heat-proof layer-stacked separators. It is believed that the reason is as follows.

Even in the case of using the LFP active material, which shows a very large resistance increase during overcharge, for the first positive electrode active material layer, the electrode reaction tends to become non-uniform in the overcharge region of 4.0 It or higher because of uneven distribution of the electrolyte retention inside the electrodes, which is due to the gas formation by side reactions and the decomposition of the electrolyte solution. Especially in the location where the reaction becomes non-uniform, an abnormal temperature increase tends to occur due to an increase in the amount of deposited lithium and gathering of electric current, resulting in a local reaction in the interior of the battery. The commonly used microporous polyethylene film, however, melts at about 165° C. owing to the properties of polyethylene and is therefore not effective against the local exothermic reaction inside the battery, thus bringing about separator meltdown easily.

In contrast, when using an electron beam cross-linked separator or a heat-proof layer-stacked separator the separator, meltdown of the separator does not easily occur even if the local exothermic reaction takes place inside the battery, since the melting temperatures of these separators are higher than that of the commonly used microporous polyethylene film.

Nevertheless, even with the use of these separators, no significant differences are observed if the positive electrode structure does not conform to the above-described construction. This is clear from the fact that the tolerance to overcharging of Reference Batteries W1 and W2 were not so different from that of Reference Battery W3. It is believed that these results are attributed to the differences in the amounts of overall heat generated from the batteries. That is, the separator is in contact with both the positive electrode surface and the negative electrode surface; this means that the separator is affected particularly easily in the overcharge test, in which an exothermic reaction tends to take place at the surfaces. It is believed that when the total amount of heat generated is great, heat shrinkage of the separator or degradation in the separator strength resulting from excessive heat may become more problematic, and other short circuit modes may also occur, in which even a small amount of deposited lithium causes dendrite-originated short circuits. In particular, in the positive electrode construction according to the present invention, the positive electrode surface is composed of LCO, which deintercalates lithium ions during overcharge most easily, and therefore, dendrite tends to grow easily on the negative electrode. Consequently, separator breakage may occur due to degradation in piercing strength, etc., of the separator under heated conditions, not the separator meltdown due to heat. It should be noted that this kind of separator breakage tends to occur more easily at high temperatures because the higher the temperature of the heat generation is, the more the strength of separator degrades.

Consequently, it is believed that although effective in preventing the film breakage due to local heating, changing the design of the separator alone is not effective in preventing the piercing film breakage due to the deposited lithium and may result in a high occurrence rate of short circuits.

(2) Comparison Between Electron Beam Cross-linked Separator and Heat-proof Layer-stacked Separator Although both the electron beam cross-linked separator and the heat-proof layer-stacked separator have similar advantageous effects in terms of the improvement in meltdown temperature, the former has the problem of heat shrinkage when reaching a certain temperature since it inherits the properties of PE microporous film expect for the meltdown temperature. On the other hand, the latter can suppress heat shrinkage dramatically and has great resistance to short circuits resulting from the heat shrinkage. It is believed that, for that reason, no short circuit occurred in the samples of Reference Battery A2, which used the heat-proof layer-stacked separator, while a few short circuits occurred in the samples of Reference Battery A1, which used the electron beam cross-linked separator.

However, the difference between Reference Battery A1 and Reference Battery A2 is little, and therefore, it is believed that the meltdown of separator due to local heating is a greater factor than the heat shrinkage of separator due to overall heating in the causes of battery short circuits during overcharge.

Although not directly related to the present experiment, the advantages of the heat-proof layer-stacked separator will be mentioned additionally.

As mentioned above, the SD temperature in the ordinary separators (PE separators) are set at 140° C. This is because the proportion of the fuse component (low-melting point component) for lowering the SD temperature needs to be restricted below a predetermined value in order to prevent internal short circuits due to the heat shrinkage. That is, if the amount of the fuse component (low-melting point component) is made large, the SD behavior will start at an early stage, making it possible to cut off electric current at a shallow charge depth, but the heat shrinkage will be great even at relatively low temperatures, leading to short circuits due to the heat shrinkage.

In contrast, the heat-proof layer-stacked separator as used in Reference Battery A2 can prevent the heat shrinkage with a layer other than that containing the fuse component, so it is therefore possible to increase the proportion of the fuse component. Consequently, it is possible to lower the SD temperature (to 120° C. or lower, for example) while preventing internal short circuits due to the heat shrinkage of the separator at the same time. Therefore, when employing such a construction, it is believed that the tolerance of the batteries to overcharging can be improved even with such batteries as Reference Batteries W1 to W3, which do not have a similar configuration to Reference Batteries A1 to A4.

Analysis of Battery Case

The constructions of the Reference Examples are suitable not only for batteries that employ a battery case made of stainless steel or the like but also for batteries that employ a flexible battery case, such as laminate batteries. The reason is as follows.

Generally, when a battery is overcharged, the battery surface temperature exceeds 100° C. (the battery interior becomes 120° C. or higher) in most cases, (cf. the experiment results for Reference Batteries W1 to W3), so even when no short circuit takes place, the evaporation of the electrolyte solution and the decomposition of the electrolyte solution occur within the battery, causing gas formation. Moreover, because of the deeper shutdown depth at the time of the overcharge, batteries employing a flexible battery case such as laminate batteries in particular have a problem that the battery swells due to the gas formation, resulting in a non-uniform reaction within the battery and the short circuits originating therefrom.

In contrast, with Reference Batteries A1 to A4, the battery surface temperatures do not exceed 100° C. even when they are overcharged, and the shutdown depth on overcharge is also shallow; therefore, the evaporation and decomposition of the electrolyte solution within the batteries are inhibited, and the gas formation is also suppressed.

Furthermore, since Preliminary Experiment 2 uses LFP as the active material in the first positive electrode active material layer, the oxidation effect in the electrode during overcharge lowers.

Figure 9:
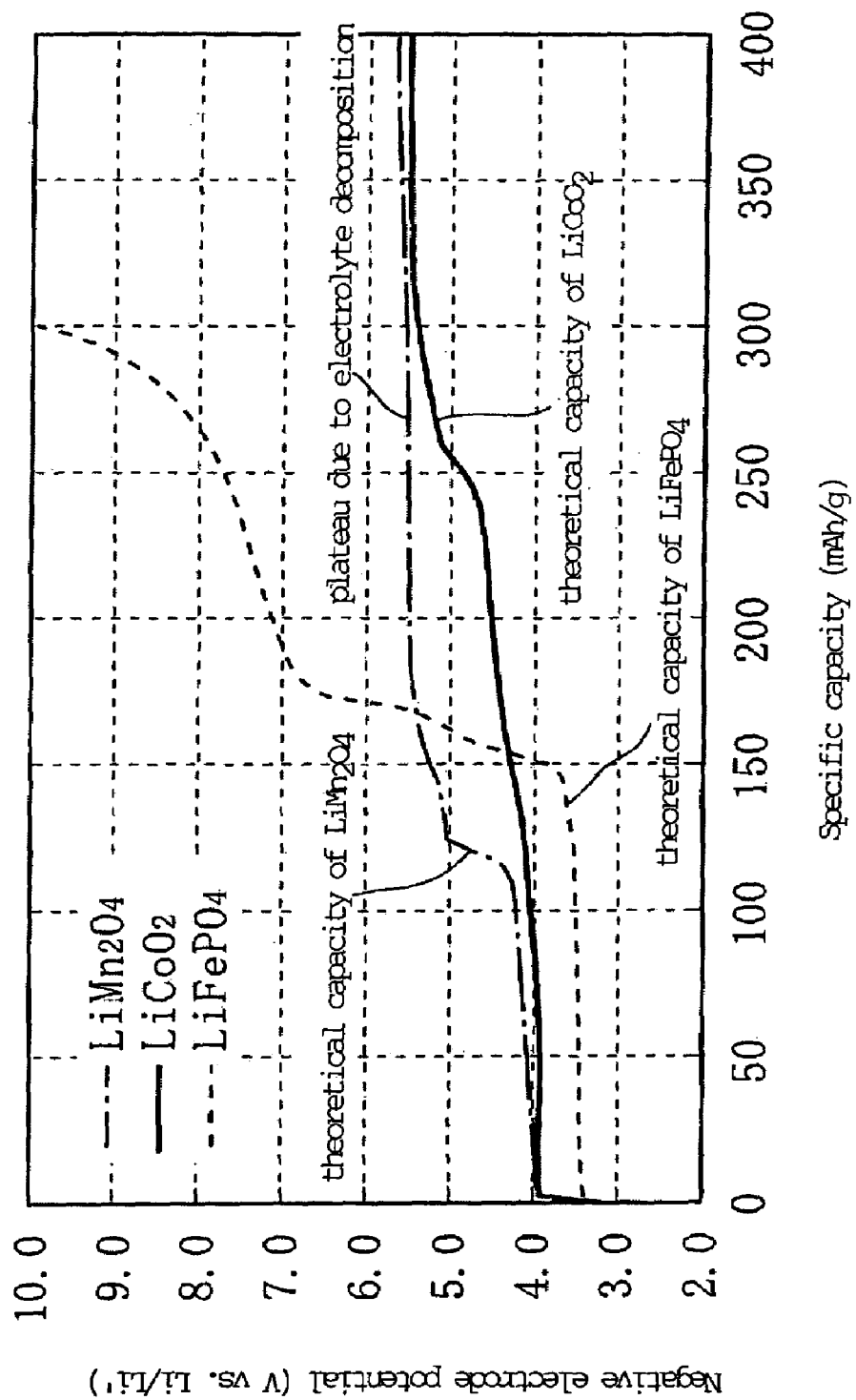
FIG. 9 is a graph illustrating specific capacity versus positive electrode potential for $LiMn_2O_4$, $LiCoO_2$, and $LiFePO_4$.

Here, the reason why the use of LFP as the active material in the first positive electrode active material layer can lower the oxidation effect in the electrode on overcharge will be discussed with reference to FIG. 9. FIG. 9 shows the continuous charge profiles of positive electrodes each of which uses LCO, LMO, and LFP alone as the active material, measured according to the following method of the experiment.

Method of the Experiment

The positive electrodes (2 cm×2 cm) using the LCO, LMO, and LFP active materials were applied onto aluminum foils in the manner as described previously, and the prepared positive electrodes were opposed to the counter electrodes of metallic lithium with separators interposed therebetween to construct single electrodes. The potentials of the respective active materials were measured versus the potential of reference lithium metal electrode to compare the profiles of the active materials during charge. The electrolyte solution used was a mixed solvent of 3:7 volume ratio of EC and DEC in which $LiPF_6$ was dissolved at a concentration of 1.0 mol/L. The batteries were charged at a constant current of 0.25 mA/cm$^2$, and the cut-off voltage was 10 V.

The graph clearly demonstrates that LFP was the least in terms of the capability of the charged positive electrode of decomposing the electrolyte solution when lithium ions had been extracted from the crystals, and the decomposition of the electrolyte solution was very little in comparison with LMO and LCO, which showed strong oxidation effect. It is believed that the plateau in the vicinity of 5.6 V in the graph suggests that the electrolyte solution made of EC and DEC underwent electrolysis on the positive electrode. Specifically, in the cases in which LMO and LCO were used as the positive electrode active material, the plateaus were observed even after lithium was completely extracted from the crystals, which suggests that the electrolyte solution was being decomposed. On the other hand, in the case in which LFP was used as the positive electrode active material, a voltage increase took place relatively quickly and almost no plateau originating from the decomposition of the electrolyte solution was observed, indicating that the oxidation effect of the electrode was low.

From the above discussion, it will be appreciated that, in batteries using a flexible battery case, such as laminate batteries, the use of LFP as the active material of the first positive electrode active material layer can prevent non-uniform reactions in the battery interior and resulting short circuits, because the battery swelling due to gas formation is inhibited sufficiently, although temporary swelling may occasionally be observed due to the evaporation of the low-boiling point solvent component. In this respect, further improvement is possible over the later-described batteries in Preliminary Experiment 5, which use LMO as the active material of the first positive electrode active material layer.

Preliminary Experiment 3

REFERENCE EXAMPLE B

A battery was fabricated in the same manner as in Reference Example A3 of Preliminary Experiment 2, except that the mass ratio of LCO and LFP in the positive electrode active material was 80:20.

The battery fabricated in this manner is hereinafter referred to as Reference Battery B.

REFERENCE EXAMPLE X

A battery was fabricated in the same manner as in Reference Example W3 of Preliminary Experiment 2, except that the mass ratio of LCO and LFP in the positive electrode active material was 80:20.

The battery fabricated in this manner is hereinafter referred to as Reference Battery X.

Experiment

Reference Batteries B and X described above were studied for tolerance to overcharging. The results are shown in Table 4. The conditions of the experiment were the same as those in the experiment employed in Preliminary Experiment 2 above.

TABLE 4

| | | Positive electrode active material | | | Number of batteries with short circuit Charge depth at SD activation (%), Highest battery surface temperature (° C.) | | | |
|---|---|---|---|---|---|---|---|---|
| Battery | Positive electrode structure | Second positive electrode active material layer (Surface side) | First positive electrode active material layer (Current collector side) | Separator | 1.0It overcharge | 2.0It overcharge | 3.0It overcharge | 4.0It overcharge |
| Reference Battery B | Double layer | LCO | LFP | Ordinary separator | No 154%, 86° C. | No 153%, 92° C. | No 154%, 95° C. | 2/2 150% |

TABLE 4-continued

| Battery | Positive electrode structure | Positive electrode active material | | Separator | Number of batteries with short circuit Charge depth at SD activation (%), Highest battery surface temperature (° C.) | | | |
| --- | --- | --- | --- | --- | --- | --- | --- | --- |
| | | Second positive electrode active material layer (Surface side) | First positive electrode active material layer (Current collector side) | | 1.0It overcharge | 2.0It overcharge | 3.0It overcharge | 4.0It overcharge |
| Reference Battery X | Single layer | LCO/LFP mixture | | Ordinary separator | 2/2 165% | 2/2 167% | 2/2 165% | — |

The mass ratio of LCO (LiCoO$_2$) and LFP (LiFPO$_4$) in the positive electrode active material was 80:20 for all the batteries.
Charge depth at SD activation was obtained by calculating charge capacity ratios up to SD activation with respect to the design capacity 780 mA.
Highest battery surface temperature was not measured for all the batteries.

Table 4 clearly demonstrates that no short circuit was observed at a current value of 2.0 It or lower and the SD behavior started at a charge depth of about 154% in the samples of Reference Battery B, which employed a double-layer positive electrode structure and used the LFP active material for the first positive electrode active material layer. In contrast, with Reference Battery X, which used the positive electrode of a mere mixture of LCO and LFP (single layer structure), all the samples caused short circuits at all the overcharge current values, and the SD behavior did not start until the charge depth reached about 165%.

It is believed that these experimental results are attributed to the same reasons as described in the experiment in Preliminary Experiment 2 above.

Preliminary Experiment 4

REFERENCE EXAMPLE C

A battery was fabricated in the same manner as in Reference Example B of Preliminary Experiment 3 except that LFP, SP300, and acetylene black were mixed at a mass ratio of 94.5:1.5:1 (92:3:2 in the case of Reference Example B in Preliminary Experiment 3) when preparing the positive electrode mixture powder for the LFP layer. (In other words, the amount of conductive agent added was made less in the present example C than in the case of Preliminary Experiment 3.)

The battery fabricated in this manner is hereinafter referred to as Reference Battery C.

REFERENCE EXAMPLE Y

A battery was fabricated in the same manner as in Reference Example X of Preliminary Experiment 3 except that LFP, SP300, and acetylene black were mixed at a mass ratio of 94.5:1.5:1 (92:3:2 in the case of Reference Example B in Preliminary Experiment 3) when preparing the positive electrode mixture powder for the LFP layer. (In other words, the amount of conductive agent added was made less in the present example Y than in the case of Preliminary Experiment 3.)

The battery fabricated in this manner is hereinafter referred to as Reference Battery Y.

Experiment

Figure 10:
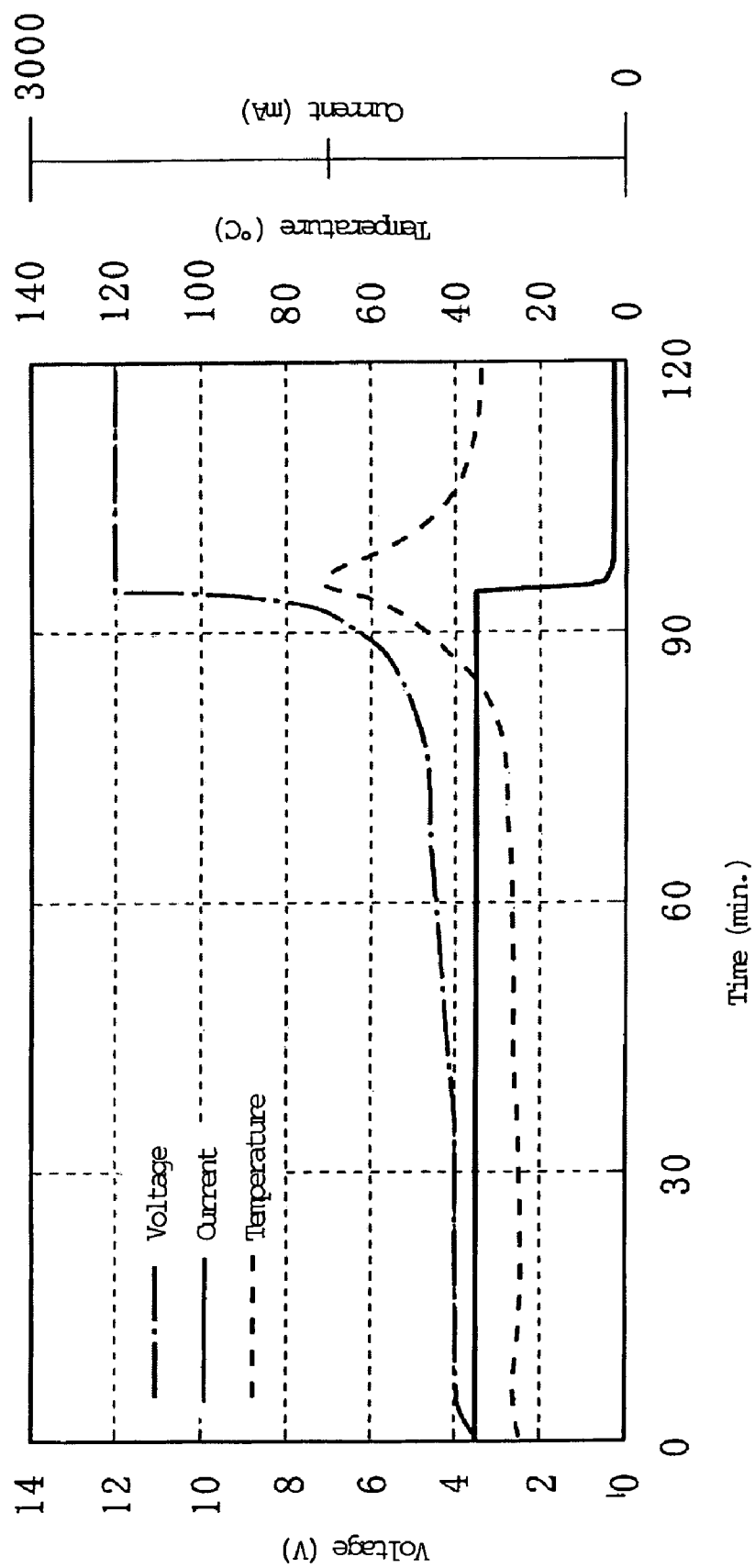
FIG. 10 is a graph illustrating the results of an overcharge test at 1 It using Reference Battery C
Figure 11:
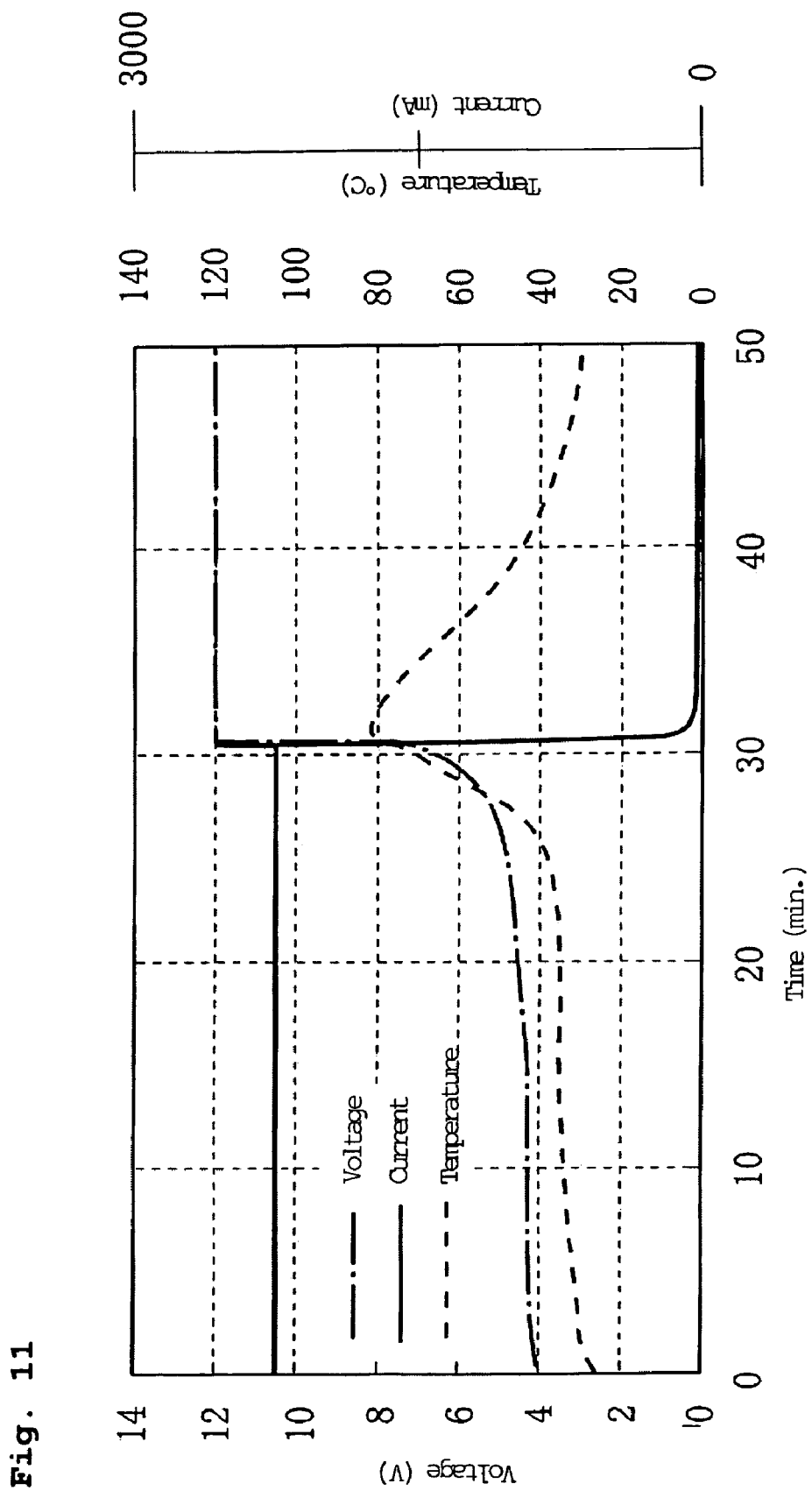
FIG. 11 is a graph illustrating the results of an overcharge test at 3 It using Reference Battery C
Figure 12:
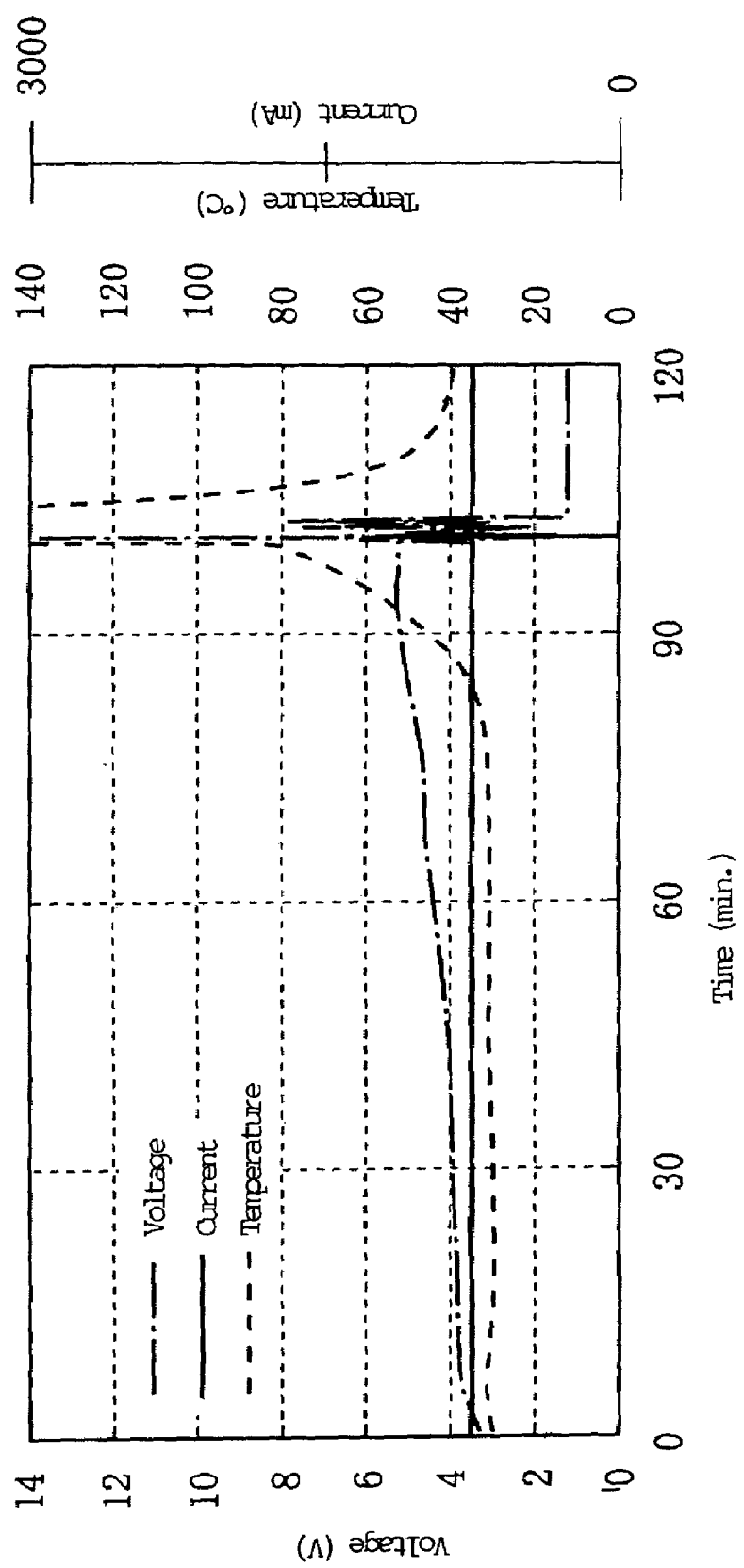
FIG. 12 is a graph illustrating the results of an overcharge test at 1 It using Reference Battery Y

Reference Batteries C and Y described above were studied for tolerance to overcharging. The results are shown in Table 5. The conditions of the experiment were the same as those in the experiment employed in Preliminary Experiment 2 above. Reference Batteries C and Y were also studied for their profiles of charging time versus current, voltage (battery voltage), and temperature (battery surface temperature) when Reference Battery C was overcharged at a current of 1.0 It (750 mA) and at a current of 3.0 It (2250 mA) and Reference Battery Y at a current of 1.0 It. The results are shown in FIGS. 10, 11, and 12, respectively.

TABLE 5

| Battery | Positive electrode structure | Positive electrode active material | | Separator | Number of batteries with short circuit Charge depth at SD activation (%), Highest battery surface temperature (° C.) | | | |
| --- | --- | --- | --- | --- | --- | --- | --- | --- |
| | | Second positive electrode active material layer (Surface side) | First positive electrode active material layer (Current collector side) | | 1.0It overcharge | 2.0It overcharge | 3.0It overcharge | 4.0It overcharge |
| Reference Battery C | Double layer | LCO | LFP | Ordinary separator | No 152%, 72° C. | No 150%, 72° C. | No 149%, 83° C. | No 147%, 72° C. |
| Reference Battery Y | Single layer | LCO/LFP mixture | | Ordinary separator | 3/3 162% | 3/3 160% | 3/3 163% | — |

The mass ratio of LCO (LiCoO$_2$) and LFP (LiFePO$_4$) in the positive electrode active material was 80:20 for all the batteries.
Charge depth at SD activation was obtained by calculating charge capacity ratios up to SD activation with respect to the design capacity 780 mA.
Highest battery surface temperature was not measured for all the batteries.

Table 5 clearly demonstrates that no short circuit was observed at all the current values and the SD behavior started at a charge depth of about 150% in the samples of Reference Battery C, which employed a double-layer positive electrode structure and used the LFP active material for the first positive electrode active material layer. In contrast, with Reference Battery Y, which used the positive electrode of a mere mixture of LCO and LFP (single layer structure), all the samples caused short circuits at all the overcharge current values, and the SD behavior did not start until the charge depth reached about 162%.

Moreover, as clearly seen from FIGS. 10 and 12, when the batteries were charged at a current of 1.0 It, Reference Battery C started the SD behavior at a charging time of about 95 minutes, and showed a small increase in the battery temperature at the time of SD. In contrast, Reference Battery Y did not start the SD behavior until the charging time reached about 100 minutes and showed an abrupt increase in the battery temperature since a short circuit occurred in the battery at the time of SD. Furthermore, FIG. 11 clearly demonstrates that, even when overcharged at a current of 3.0 It, Reference Battery C started the SD behavior at a charging time of about 31 minutes and showed a small increase in the battery temperature at the time of SD.

It is believed that these experimental results are attributed to the same reasons as described in the experiment in Preliminary Experiment 2 above.

In addition, although the mass ratio of LCO and LFP is the same in both Reference Battery B in Preliminary Experiment 3 above and Reference Battery C in the present Preliminary Experiment 4, the samples of Reference Battery B caused short circuits at an overcharge current of 4.0 It, whereas the samples of Reference Battery C caused no short circuits even at an overcharge current of 4.0 It. This demonstrates that the tolerance of the battery to overcharging can be improved further by reducing the amount of the conductivity enhancing agent in the LFP layer. The reason is as follows.

The advantageous effects achieved by the present invention are exhibited when the positive electrode active material having the highest resistance increase rate during overcharge (LFP in the present reference example) is contained as the main component in the first positive electrode active material. However, if a large amount of conductivity enhancing agent is contained in the LFP layer as in Reference Battery B, the resistance increasing effect in the LFP layer may be lessened because of the presence of the carbon conductivity enhancing agent. In contrast, when the amount of the carbon conductivity enhancing agent contained in the LFP layer is reduced as in Reference Battery C, the resistance increase effect in the LFP layer during overcharge can be fully exhibited.

Nevertheless, reducing the amount of the conductivity enhancing agent can impede smooth charge-discharge operations during the normal charge-discharge reaction. Accordingly, in order to attain smooth normal charge-discharge reactions even with a small amount of conductivity enhancing agent and at the same time improve the tolerance of the battery to overcharging remarkably, it is desirable that the thickness of the LFP layer be made as thin as possible.

Preliminary Experiment 5

REFERENCE EXAMPLE D

A battery was fabricated in the same manner as in Reference Example A3 of Preliminary Experiment 2, except that a spinel-type lithium manganese oxide (hereinafter also abbreviated as "LMO") represented by the formula $LiMn_2O_4$ was used in place of LFP as the first positive electrode active material (the positive electrode active material on the current collector side). It should be noted that since LMO has better electrical conductivity than LFP, no carbon component was allowed to be contained in the interior of the secondary particle.

The battery fabricated in this manner is hereinafter referred to as Reference Battery D.

REFERENCE EXAMPLE Z

A battery was fabricated in the same manner as in Reference Example W3 of Preliminary Experiment 2, except that LMO was used in place of LFP as the first positive electrode active material.

The battery fabricated in this manner is hereinafter referred to as Reference Battery Z.

Experiment

Reference Batteries D and Z described above were studied for the tolerance to overcharging. The results are shown in Table 6. The conditions of the experiment were the same as those in the experiment employed in Preliminary Experiment 2 above.

TABLE 6

| Battery | Positive electrode structure | Positive electrode active material | | Separator | Number of batteries with short circuit | | | |
|---|---|---|---|---|---|---|---|---|
| | | Second positive electrode active material layer (Surface side) | First positive electrode active material layer (Current collector side) | | Charge depth at SD activation (%), Highest battery surface temperature (° C.) | | | |
| | | | | | 1.0It overcharge | 2.0It overcharge | 3.0It overcharge | 4.0It overcharge |
| Reference Battery D | Double layer | LCO | LMO | Ordinary separator | No 152%, 72° C. | No 151%, 124° C. | 2/3 151%, 118° C. | — |
| Reference Battery Z | Single layer | | LCO/LMO mixture | Ordinary separator | No 158% | 3/3 157% | 3/3 154% | — |

The mass ratio of LCO ($LiCoO_2$) and LMO ($LiMn_2O_4$) in the positive electrode active material was 80:20 for all the batteries.
Charge depth at SD activation was obtained by calculating charge capacity ratios up to SD activation with respect to the design capacity 780 mA.
Highest battery surface temperature was not measured for all the batteries.

Table 6 clearly demonstrates that no short circuit was observed up to a current value of 2.0 It and the SD behavior started at a charge depth of about 150% in the samples of Reference Battery D, which employed a double-layer positive electrode structure and used the LMO active material for the first positive electrode active material layer. In contrast, with Reference Battery Z, which used the positive electrode made of a mere mixture of LCO and LMO (single layer structure), all the samples caused short circuits during overcharge at a current of 2.0 It or higher, and the SD behavior did not start until the charge depth reached about 157%.

Thus, Reference Battery D shows a superior tolerance to overcharging to Reference Battery Z. This is attributed to the same reasons as described in the experiment in Preliminary Experiment 2 above.

EXAMPLES

As will be understood from the foregoing Preliminary Experiments 2 to 5, the tolerance of a battery to overcharging can be improved when the positive electrode active material having the highest resistance increase rate during overcharge (e.g., LMO or LFP) among the positive electrode active materials is used to construct the positive electrode. It should be noted here that in Preliminary Experiments 2 to 5, the first active material layer contains a conductivity enhancing agent in a predetermined amount and a binder agent in an amount corresponding to the amount of the conductivity enhancing agent, in addition to the positive electrode active material particles. Containing a predetermined amount of conductivity enhancing agent means that the resistance increase in the first active material layer during overcharge is hindered. Therefore, it is desirable that no conductivity enhancing agent be contained in order to enhance the tolerance of the battery to overcharging sufficiently. However, if the amount of the conductivity enhancing agent is too small or no conductivity enhancing agent is added in the manufacturing method of a paste type electrode, in which an active material slurry containing a positive electrode active material, a conductivity enhancing agent, and a binder agent is applied onto a positive electrode current collector, the problem arises that the normal charge-discharge reaction cannot take place smoothly.

Another problem is that, when a paste type manufacturing method is used as in Preliminary Experiments 2 to 5, the first positive electrode active material layer cannot be made thin; therefore, the content of the positive electrode active material of the second positive electrode active material layer, which has a greater capacity per unit volume than the positive electrode active material used for the first positive electrode active material layer, becomes relatively small, degrading the positive electrode capacity.

Accordingly, in order to perform the normal charge-discharge reaction smoothly while preventing the positive electrode capacity from degrading and moreover to improve the tolerance of the battery to overcharging remarkably, it is desirable that the thickness of the first positive electrode active material be made as thin as possible.

Taking the above matters into consideration, the present inventors have found that the use of a cold spraying method for preparing the first positive electrode active material layer in a non-aqueous electrolyte battery is very promising. The reason is as follows. With the cold spraying method, particles of a positive electrode active material form a dense surface film on a surface of a positive electrode current collector due to the plastic deformation of the particles that occurs when the particles accelerated to a supersonic velocity collide with a substrate material (positive electrode current collector). This eliminates the need for binder agents and conductivity enhancing agents, and as a result, it becomes possible to form the first positive electrode active material layer into a thin film.

Experiment 1

In the same manner as in the first embodiment described above, a first positive electrode active material layer made of LFP (one in which 5% of carbon was contained as a conductive agent in baking) was formed on a substrate material (positive electrode current collector) made of aluminum, and at this stage, a SEM observation was made. The result is shown in FIG. 13.

Figure 13:
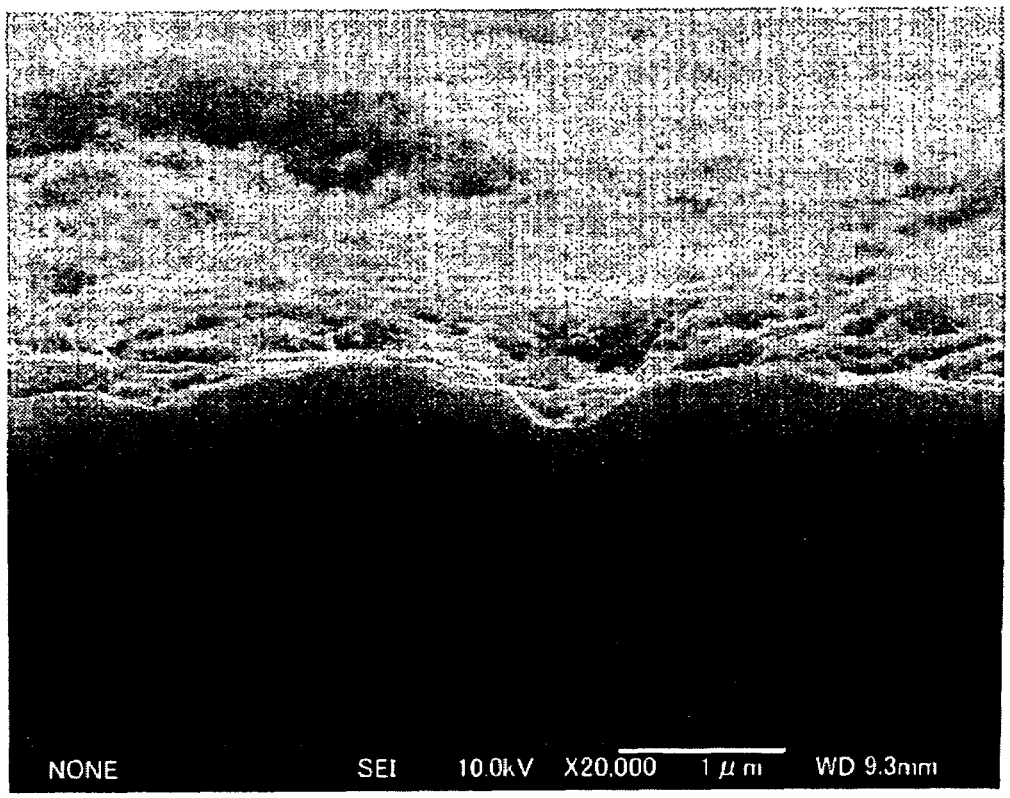
FIG. 13 is a SEM photograph of a LFP layer formed on an aluminum foil according to the method of the present invention.

FIG. 13 clearly shows that the film thickness of the first positive electrode active layer 61 was 200 nm to 500 nm, which was less than the particle diameter of the LFP particles (about 5 μm).

In addition, the first positive electrode active layer 61 was subjected to an X-ray analysis, and it was confirmed that the layer was made of $LiFePO_4$.

Experiment 2

Figure 14:
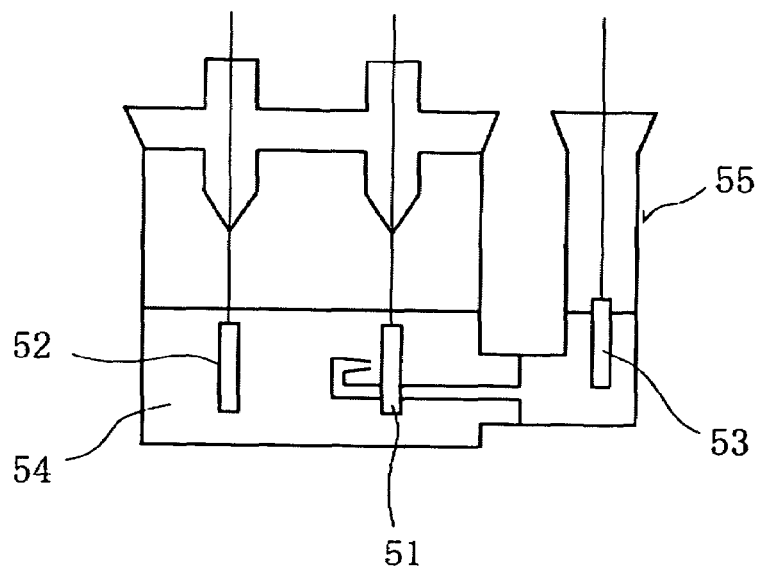
FIG. 14 is a diagram illustrating a test cell.

A three-electrode test cell as illustrated in FIG. 14 was prepared in the following manner. A first positive electrode active material layer made of LFP was formed on an aluminum foil by cold spraying to prepare a working electrode 51. The working electrode 51 and a counter electrode 52 made of lithium metal were immersed into an electrolyte solution 54 as described above, which was filled in a three-electrode glass beaker cell 55, and a reference electrode 53 made of lithium metal was used, to thus form the three-electrode test cell.

Figure 15:
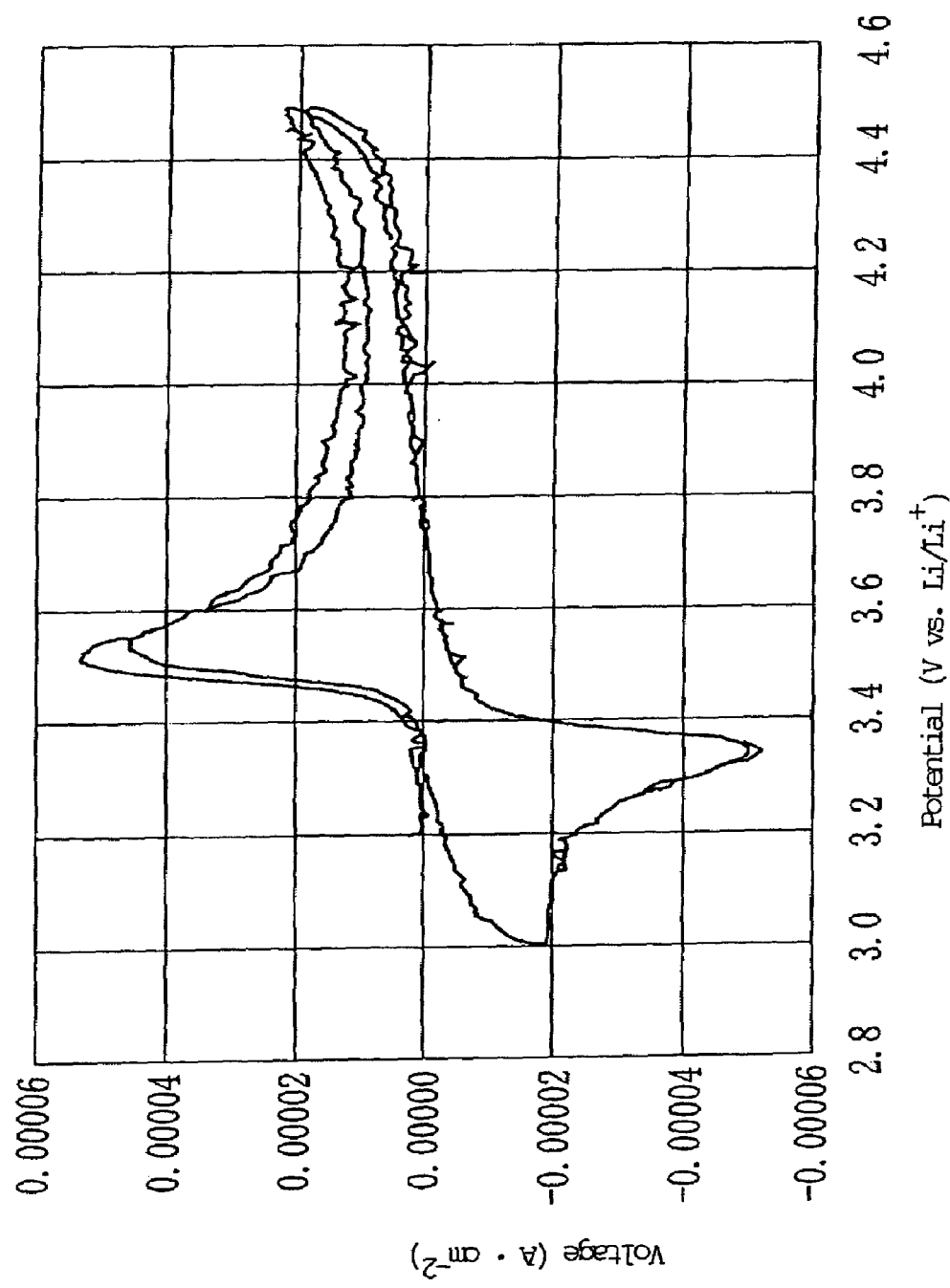
FIG. 15 is a graph illustrating the C-V characteristics measured using the test cell.

With the above-described test cell, a C-V measurement was conducted. The results are shown in FIG. 15. As clearly seen from FIG. 15, it is confirmed that the LFP thin film of the first positive electrode active material layer functions as LFP, i.e., the electrochemical property is not changed. This demonstrates that the positive electrode manufactured according to the method of the present invention can perform the normal charge-discharge reaction smoothly while fully exhibiting the function of the resistance increase during overcharge.

OTHER EMBODIMENTS (1) The positive electrode active materials are not limited to lithium cobalt oxide and the olivine-type lithium phosphate compound. Other usable materials include lithium nickel oxide, layered lithium-nickel compounds, and spinel-type lithium manganese oxides. Table 7 shows the resistance increase rates during overcharge, the amounts of lithium extracted in overcharging, and the amounts of remaining lithium in a charged state to 4.2 V, for the positive electrode active materials made of these substances. Herein, among the positive electrode active materials selected, it is desirable to use the one having the highest resistance increase rate during overcharge for the first positive electrode active material layer (the layer nearer the positive electrode current collector) with reference to Table 7.

TABLE 7

| Type of positive electrode active material | Resistance increase during overcharge (4.2 V reference) | Amount of lithium that can be extracted in overcharging (4.2 V reference) | Amount of remaining lithium in 4.2 V charged state (%) |
|---|---|---|---|
| Lithium cobalt oxide ($LiCoO_2$) | Small (Slow) | Very large | 40 |
| Spinel-type lithium manganese oxide ($LiMn_2O_4$) | Large (Fast) | Small | Little |
| Lithium nickel oxide ($LiNiO_2$) | Fair | Large | 20-30 |

TABLE 7-continued

| Type of positive electrode active material | Resistance increase during overcharge (4.2 V reference) | Amount of lithium that can be extracted in overcharging (4.2 V reference) | Amount of remaining lithium in 4.2 V charged state (%) |
|---|---|---|---|
| Olivine-type lithium ion phosphate (LiFePO$_4$) | Large (Fast) | Small | Little |
| Layered lithium-nickel compound (LiNi$_{1/3}$Mn$_{1/3}$Co$_{1/3}$O$_2$) | Fair | Large | 20-30 |

The olivine-type lithium phosphate compound is not limited to LiFePO$_4$. Specifically, the details are as follows.

The olivine-type lithium phosphate compounds represented by the general formula LiMPO$_4$ show varying working voltage ranges depending on the kind of the element M. It is well known that LiFePO$_4$ results in a plateau from 3.3 V to 3.5 V in the 4.2 V region, in which commercially available lithium-ion batteries are generally used, and it deintercalates most of the Li ions from the crystals with the charge at 4.2 V. In the case where the element M is a Ni—Mn-based mixture, the plateau emerges from 4.0 V to 4.1 V, and the compound deintercalates most of the Li ions from the crystals with the charge at 4.2 V to 4.3 V. In order to achieve the advantageous effects of the invention with currently available lithium ion batteries, it is necessary that the olivine-type lithium phosphate compound exhibit its advantageous effects quickly while preventing the positive electrode capacity from degrading by contributing to charging and discharging during a normal charge-discharge reaction to a certain extent, and that it have a discharge working voltage similar to those of LCO and Li—NiMnCo oxide compounds so that the battery discharge curve will not result in a multi-staged shape. In that sense, it is desirable to use an olivine lithium oxide compound in which the element M contains at least one element selected from Fe, Ni, and Mn, and that has a discharge working potential of from about 3.0 V to about 4.0 V.

On the other hand, in the case of using a spinel-type lithium manganese oxide for the first positive electrode active material layer, the interior of the secondary particle need not contain a carbon component (conductive agent) since spinel-type lithium manganese oxides show better electric conductivity than olivine-type lithium phosphate compounds.

(2) Although the foregoing examples use an olivine-type lithium phosphate compound alone as the active material of the first positive electrode active material layer, this construction is merely illustrative of the invention. It is of course possible to use, for example, a mixture of a spinel-type lithium manganese oxide and an olivine-type lithium iron phosphate as the active material of the first positive electrode active material layer. Likewise, it is possible to use a mixture material for the second positive electrode active material layer.

(3) The positive electrode structure is not limited to the two-layer structure, and a structure comprising three or more layers may of course be employed. For example, in the case of the three-layer structure, an active material having a large resistance increase rate should be used for the lowermost layer (the layer adjacent to the positive electrode current collector).

(4) The method for effecting cross-linking in the separator is not limited to the electron beam cross-linking, and it is also possible to adopt a method in which cross-linking is effected chemically. The method in which cross-linking is effected chemically is also capable of raising the meltdown temperature. However, the method in which cross-linking is effected chemically may change other physical properties of the separator considerably, so it is necessary that fine adjustments be made during the production. For this reason, it is desirable from the viewpoint of improving productivity that the cross-linking be effected by electron beams.

(5) The source material used in preparing the heat-proof layer-stacked separator is not limited to polyamide, and other materials may be used, such as polyimide and polyamideimide.

(6) The water-soluble solvent used to prepare the heat-proof layer stacked separator is not limited to N-methyl-2-pyrrolidone but other solvents may also be used, such as N,N-dimethylformamide and N,N-dimethylacetamide.

(7) The method for mixing the positive electrode mixture is not limited to the above-noted mechanofusion method. Other possible methods include a method in which the mixture is dry-blended while milling it with a Raikai-mortar, and a method in which the mixture is wet-mixed and dispersed directly in a slurry.

(8) The negative electrode active material is not limited to graphite described above. Various other materials may be employed, such as coke, tin oxides, metallic lithium, silicon, and mixtures thereof, as long as the material is capable of intercalating and deintercalating lithium ions.

(9) The lithium salt in the electrolyte solution is not limited to LiPF$_6$, and various other substances may be used, including LiBF$_4$, LiN(SO$_2$CF$_3$)$_2$, LiN(SO$_2$C$_2$F$_5$)$_2$, LiPF$_{6-X}$(C$_n$F$_{2n+1}$)$_X$ (wherein 1<x<6 and n=1 or 2), which may be used either alone or in a combination of two or more of them. The concentration of the lithium salt is not particularly limited, but it is preferable that the concentration of the lithium salt be restricted in the range of from 0.8 moles to 1.5 moles per 1 liter of the electrolyte solution. The solvents for the electrolyte solution are not particularly limited to ethylene carbonate (EC) and diethyl carbonate (DEC) mentioned above, and preferable solvents include carbonate solvents such as propylene carbonate (PC), γ-butyrolactone (GBL), ethyl methyl carbonate (EMC), and dimethyl carbonate (DMC). More preferable is a combination of a cyclic carbonate and a chain carbonate.

(10) The present invention may be applied to gelled polymer batteries as well as liquid-type batteries. In this case, usable examples of the polymer material include polyether-based solid polymer, polycarbonate solid polymer, polyacrylonitrile-based solid polymer, oxetane-based polymer, epoxy-based polymer, and copolymers or cross-linked polymers comprising two or more of these polymers, as well as PVDF. Any of the above examples of polymer material may be used in combination with a lithium salt and an electrolyte to form a gelled solid electrolyte.

The present invention is applicable not only to driving power sources for mobile information terminals such as mobile telephones, notebook computers and PDAs but also to large-sized batteries for, for example, in-vehicle power sources for electric automobiles or hybrid automobiles.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

This application claims priority of Japanese patent application No. 2005-191874, filed Jun. 30, 2005, which is incorporated herein by reference.

What is claimed is:

1. A method of manufacturing a non-aqueous electrolyte battery having a positive electrode including a positive electrode active material-layer stack and a positive electrode current collector, the positive electrode active material-layer stack being formed on a surf ace of the positive electrode current collector and comprising a plurality of positive electrode active material layers containing a plurality of positive electrode active materials, a negative electrode including a negative electrode active material layer, and a separator interposed between the electrodes, the method comprising:

a first step of causing particles of a positive electrode active material having the highest resistance increase rate among the plurality of positive electrode active materials to adhere to a surface of the positive electrode current collector using a cold spraying method, to form one of the positive electrode active material layers;

a second step of applying another one or more of the plurality of positive electrode active materials onto a surface of the one of the positive electrode active material layers to form one or more other positive electrode active material layers, whereby the positive electrode is prepared; and a third step of arranging the positive electrode and the negative electrode and interposing the separator therebetween.

2. The method of manufacturing a non-aqueous electrolyte battery according to claim 1, wherein in the first step the particles of the positive, electrode active material contain a conductive agent.

3. The method of manufacturing a non-aqueous electrolyte battery according to claim 1, wherein in the first step the particles consist of the positive electrode active material having the highest resistance increase rate among the plurality of positive electrode active materials.

* * * * *